(12) United States Patent
Testa

(10) Patent No.: US 7,415,463 B2
(45) Date of Patent: Aug. 19, 2008

(54) PROGRAMMING TREE DATA STRUCTURES AND HANDLING COLLISIONS WHILE PERFORMING LOOKUP OPERATIONS

(75) Inventor: James Fraser Testa, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 592 days.

(21) Appl. No.: 10/703,733

(22) Filed: Nov. 7, 2003

(65) Prior Publication Data

US 2004/0254909 A1 Dec. 16, 2004

Related U.S. Application Data

(63) Continuation-in-part of application No. 10/437,116, filed on May 13, 2003.

(51) Int. Cl.
*G06F 17/30* (2006.01)
*G06F 17/00* (2006.01)

(52) U.S. Cl. .......................................... 707/6; 707/100
(58) Field of Classification Search ................ 707/1–10, 707/100, 101, 200
See application file for complete search history.

(56) References Cited

U.S. PATENT DOCUMENTS

| | | |
|---|---|---|
| 5,088,032 A | 2/1992 | Bosack |
| 5,528,701 A | 6/1996 | Aref |
| 5,574,910 A | 11/1996 | Bialkowski et al. |
| 5,627,748 A * | 5/1997 | Baker et al. ............... 715/531 |
| 5,651,099 A | 7/1997 | Konsella |
| 5,721,899 A | 2/1998 | Namba |
| 5,740,171 A | 4/1998 | Mazzola et al. |
| 5,781,431 A | 7/1998 | Duret et al. |
| 5,781,772 A | 7/1998 | Wilkinson, III et al. |
| 5,787,430 A * | 7/1998 | Doeringer et al. ............ 707/100 |
| 5,809,501 A | 9/1998 | Noven |
| 5,829,004 A | 10/1998 | Au |
| 5,848,416 A | 12/1998 | Tikkanan |

(Continued)

FOREIGN PATENT DOCUMENTS

WO WO 2004/102856 11/2004

OTHER PUBLICATIONS

U.S. Appl. No. 10/833,532, filed Apr. 26, 2004, Eatherton et al.

(Continued)

*Primary Examiner*—Don Wong
*Assistant Examiner*—Marc R Filipczyk
(74) *Attorney, Agent, or Firm*—The Law Office of Kirk D. Williams

(57) ABSTRACT

Inter alia, methods, apparatus, data structures, computer-readable medium, mechanisms, and means for programming routes and access control lists in comparison tree data structures and their use such as in performing lookup operations for use in routers, packet switching systems, and other devices. One implementation identifies a parent node, the parent node including a first node value for indicating a path through a subtree from a root node to the parent node, and the parent node including a first base pointer. A child node of the parent node is added at a memory location based on the base pointer and a next stride value, the child node including a second node value including the first node value and the next stride value.

16 Claims, 33 Drawing Sheets

U.S. PATENT DOCUMENTS

| | | | |
|---|---|---|---|
| 5,857,196 A * | 1/1999 | Angle et al. | 707/102 |
| 5,884,297 A | 3/1999 | Noven | |
| 5,920,857 A | 7/1999 | Rishe et al. | |
| 5,920,886 A | 7/1999 | Feldmeier | |
| 5,995,971 A | 11/1999 | Douceur et al. | |
| 6,014,659 A | 1/2000 | Wilkinson, III et al. | |
| 6,018,524 A | 1/2000 | Turner et al. | |
| 6,041,053 A | 3/2000 | Douceur et al. | |
| 6,067,574 A | 5/2000 | Tzeng | |
| 6,115,716 A | 9/2000 | Tikkanan et al. | |
| 6,141,738 A | 10/2000 | Munter et al. | |
| 6,185,559 B1 * | 2/2001 | Brin et al. | 707/6 |
| 6,236,658 B1 | 5/2001 | Essbaum et al. | |
| 6,237,061 B1 | 5/2001 | Srinivasan et al. | |
| 6,243,667 B1 | 6/2001 | Kerr et al. | |
| 6,289,414 B1 | 9/2001 | Feldmeier et al. | |
| 6,295,576 B1 | 9/2001 | Ogura et al. | |
| 6,298,339 B1 | 10/2001 | Bjornson | |
| 6,334,153 B2 | 12/2001 | Boucher et al. | |
| 6,341,346 B1 | 1/2002 | Benyaoun et al. | |
| 6,356,902 B1 * | 3/2002 | Tan et al. | 707/10 |
| 6,356,951 B1 | 3/2002 | Gentry, Jr. | |
| 6,560,610 B1 | 5/2003 | Eatherton et al. | |
| 6,564,211 B1 | 5/2003 | Andreev et al. | |
| 6,725,326 B1 | 4/2004 | Patra et al. | |
| 6,728,732 B1 | 4/2004 | Eatherton et al. | |
| 6,741,985 B2 | 5/2004 | Green | |
| 7,002,917 B1 * | 2/2006 | Saleh | 370/238 |
| 7,158,975 B2 * | 1/2007 | Mazzagatti | 707/10 |

OTHER PUBLICATIONS

U.S. Appl. No. 10/356,262, filed Jan. 31, 2003, Rangarajan et al.
U.S. Appl. No. 10/278,623, filed Oct. 23, 2002, Eatherton et al.
U.S. Appl. No. 10/161,504, filed May 31, 2002, Rangarajan et al.
William N. Eatherton, Hardware-Based Internet Protocol Prefix Lookups, Master's thesis, Sever Institute, Washington University, St. Louis, MO, May 1999, 109 pages.
Donald R. Morrison, "PATRICIA—Practical Algorithm to Retrieve Information Coded in Alphanumeric," Journal of the ACM, vol. 15, No. 4, Oct. 1968, pp. 514-534.
Waldvogel et al., "Scalable High Speed IP Routing Lookups," Proc. Sigcomm '97, ACM, 1997, pp. 25-36.
Lampson et al., "IP Lookups Using Multiway and Multicolumn Search," Proc. Infocom 98, Mar. 1998, 24 pages.
V. Srinivasan and George Varghese, "Faster IP Lookups using Controlled Prefix Expansion," ACM Sigmetrics Peformance Evaluation Review, vol. 26 No. 1, Jun. 1998, p. 1-10.
Stefan Nilsson and Gunnar Karlsson, "Fast Address Look-up for Internet Routers," Proceedings of IEEE Broadband Communications, Apr. 1998, 12 pages.
Lampson et al., "IP Lookups Using Multiway and Multicolumn Search," IEEE Transactions on Networking, vol. 7, No. 3, Jun. 1999, pp. 324-334.
Lockwood et al., "Field Programmable Port Extender (FPX) for Distributed Routing and Queuing, "Proceedings of the ACM/SIGDA international symposium on Field programmable gate arrays, Feb. 2000, pp. 137-144.
Ruiz-Sanchez et al., "Survey and Taxonomy of IP Address Lookup Algorithms," IEEE Network Magazine, vol. 15, No. 2, Mar./Apr. 2001, pp. 8-23.
Pankaj Gupta and Nick McKewon, "Algorithms for Packet Classification," IEEE Network Magazine, vol. 15, No. 2, Mar./Apr. 2001, pp. 24-32.
Iyer et al., "ClassiPI: An Architecture for Fast and Flexible Packet Classification," IEEE Network Magazine, vol. 15, No. 2, Mar./Apr. 2001, pp. 33-41.
Waldvogel et al., "Scalable High Speed Prefix Matching," ACM Transactions on Computer Systems, vol. 19, No. 4, Nov. 2001, pp. 440-482.
Devavrat Shah and Pankaj Gupta, "Fast Incremental Updates on Ternary-CAMs for Routing Lookups and Packet Classification," Proc. Hot Interconnects VIII, Aug. 2000, Stanford. IEEE Micro, vol. 21, No. 1, Jan./Feb. 2001, 9 pages.
Waldvogel et al., "Scalable Best Matching Prefix Lookups," PODC 98, ACM 1998.
Radia Perlman, Interconnections: Bridges, Routers, Switches, and Internetworking Protocols, Second Edition, Addison-Wesley, 2000, pp. 347-365.
Pankaj Gupta and Nick McKeown, "Algorithms for Packet Classification," IEEE Network Special Issue, Mar./Apr. 2001, vol. 15, No. 15, No. 2, pp. 24-32 (reprint 29 pages).
Srinivasan et al., "Packet Classification Using Tuple Space Search," ACM Computer Communication Review, 1999. ACM Sigcomm'99, Sep. 1999 (12 pages).
Srinivasan et al., "Fast and Scalable Layer Four Switching," ACM Computer Communication Review, 28(4):191-202, 1998. ACM Sigcomm'98, Sep. 1998 (12 pages).
Stefan Nilsson and Gunnar Karlsson, "IP-Address Lookup Using LC-Tries," IEEE Journal on Selected Areas in Communications, Jun. 1999 (12 pages).

* cited by examiner

```
node:= root; (* node is the current trie node being examined; so we start with root as the first trie node *)
i:= 1; (* i is the index into the stride array; so we start with the first stride *)
do forever
    if (treeFunction(node.internalBitmap,stride[i]) is not equal to null) then
            (* there is a longest matching prefix, update pointer *)
        LongestMatch:= node.ResultsPointer + CountOnes(node.internalBitmap,
        treeFunction(node.internalBitmap, stride[i]));
    if (node.externalBitmap[stride[i]] = 0) then (* no extending path through this trie node for this search *)
        NextHop:= Result[LongestMatch]; (* lazy access of longest match pointer to get next hop pointer *)
        break; (* terminate search)
    else (* there is an extending path, move to child node *)
        node:= node.childPointer + CountOnes(node.externalBitmap, stride[i]);
        i:=i+1; (* move on to next stride *)
end do;
```

TREE BITMAP SEARCH ALGORITHM FOR DESTINATION ADDRESS WHOSE BITS ARE IN AN ARRAY CALLED STRIDE

FIGURE 1D
PRIOR ART

PROGRAMMING TREE DATA STRUCTURES AND HANDLING COLLISIONS WHILE PERFORMING LOOKUP OPERATIONS

CROSS-REFERENCE TO RELATED APPLICATIONS

This is a continuation-in-part of application Ser. No. 10/437,116, filed May 13, 2003, and hereby incorporated by reference.

TECHNICAL FIELD

One embodiment of the invention especially relates to communications and computer systems; and more particularly, one embodiment relates to programming routes and access control lists in comparison tree data structures and their use such as in performing lookup operations for use in routers, packet switching systems, and other devices.

BACKGROUND

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP).

A network device, such as a switch or router, typically receives, processes, and forwards or discards a packet based on one or more criteria, including the type of protocol used by the packet, addresses of the packet (e.g., source, destination, group), and type or quality of service requested. Additionally, one or more security operations are typically performed on each packet. But before these operations can be performed, a packet classification operation must typically be performed on the packet.

IP forwarding requires a longest matching prefix computation at wire speeds. The current IP version, IPv4, uses 32 bit destination addresses and a core Internet router can have over 200,000 prefixes. A prefix is typically denoted by a bit string (e.g., 01*) followed by a '*' to indicate the value of these trailing bits does not matter. For destination routing, each prefix entry in a routing table typically consists of a prefix and a next hop value. For example, suppose the database consists of only two prefix entries (01*→L1;0100*→L2). If the router receives a packet with destination address that starts with 01000, the address matches both the first prefix (01*) and the second prefix (0100*). Because the second prefix is the longest match, the packet should be sent to next hop L2. On the other hand, a packet with destination address that starts with 01010 should be sent to next hop L1. The next hop information will typically specify an output port on the router and possibly a data link address.

FIG. 1A illustrates an example of a set of prefixes P1-9 shown as nodes 1A-9A in table 10A and as nodes 1B-9B in unibit trie 10B. Also shown in unibit trie 10B are placeholder/vacant nodes 11B-18B, which represent non-matching nodes (i.e., nodes that are not possible results as a longest matching prefix.) For example, a string of 1110000 matches prefixes P1 (1B), P2 (2B) and P5 (5B), with the longest matching prefix being P5 (B5).

One known approach is typically referred to as "tree bitmap", described in Eatherton et al., "Data Structure Using a Tree Bitmap and Method for Rapid Classification of Data in a Database," U.S. Pat. No. 6,560,610, issued May 6, 2003, which is hereby incorporated by reference. Tree bitmap is a multibit trie algorithm that implements a representation of the trie by grouping nodes into sets of strides. A stride is typically defined as the number of tree levels of the binary trie that are grouped together or as the number of levels in a tree accessed in a single read operation representing multiple levels in a tree or trie. FIG. 1B illustrates one such partitioning of nodes P1-P9 (1B-9B) and vacant nodes 11B-18B (FIG. 1A) into strides 20-25. In this example, the stride is of size three.

In a known implementation of the tree bitmap algorithm, all child nodes of a given trie node are stored contiguously, which allows the use of just one pointer for all children (the pointer points to the start of the child node block), as each child node can be calculated as an offset from the single pointer. This can reduce the number of required pointers and cuts down the size of trie nodes.

In addition, there are two bit maps per trie node, one for all the internally stored prefixes and one for the external pointers. The internal bit map has a 1 bit set for every prefix stored within this node. Thus, for an r-bit trie node, there are $(2^r)-1$ possible prefixes of lengths less than r, and hence, a $(2^r)-1$ bit map is used. The external bit map contains a bit for all possible $2^r$ child pointers. A trie node is of fixed size and only contains an external pointer bit map, an internal next hop information bit map, and a single pointer to the block of child nodes. The next hops associated with the internal prefixes are stored within each trie node in a separate array associated with this trie node. For memory allocation purposes, result (e.g., leaf) arrays are normally an even multiple of the common node size (e.g., with 16-bit next hop pointers, and 8-byte nodes, one result node is needed for up to four next hop pointers, two result nodes are needed for up to 8, etc.) Putting next hop pointers in a separate result array potentially requires two memory accesses per trie node (one for the trie node and one to fetch the result node for stored prefixes). A simple lazy strategy to not access the result nodes till the search terminates is typically used. The result node corresponding to the last trie node encountered in the path that contained a valid prefix is then accessed. This adds only a single memory reference at the end besides the one memory reference required per trie node.

FIG. 1C illustrates one representation of a tree bitmap implementation of the prefix example shown in FIGS. 1A-B. As shown, root node 30 represents the first level trie. Child pointer 31 connects root node 30 to child array 40 containing the second level strides. In level 3, there are two child arrays 50 and 60, which are connected from child array 40 respectively by child pointers 41 and 42.

A longest prefix match is found by starting with the root node. The first bits of the destination address (corresponding to the stride of the root node, three in this example) are used to index into the external bit map at the root node at say position P. If a 1 is located in this position, then there is a valid child pointer. The number of 1's not including and to the left of this 1 (say I) is determined. Because the pointer to the start position of the child block (say C) is known and the size of each trie node (say S), the pointer to the child node can be computed as $C+(I * S)$.

Before moving on to the child, the internal bit map is checked to see if there is a stored prefix corresponding to position P. To do so, imagine successively remove bits of P starting from the right and index into the corresponding position of the internal bit map looking for the first 1 encountered.

For example, suppose P is 101 and a three bit stride is used at the root node bit map. The right most bit is first removed which results in the prefix 10*. Because 10* corresponds to the sixth bit position in the internal bit map, a check is made to determine if there is a 1 in that position. If not, the right most two bits (resulting in the prefix 1*) are removed. Because 1* corresponds to the third position in the internal bit map, a check is made to determine if a 1 is there. If a 1 is found there, then the search ends. If a 1 is not found there, then the first three bits are removed and a search is performed for the entry corresponding to * in the first entry of the internal bit map.

Once it has been determined that a matching stored prefix exists within a trie node, the information corresponding to the next hop from the result node associated with the trie node is not immediately retrieved. Rather, the number of bits before the prefix position is counted to indicate its position in the result array. Accessing the result array would take an extra memory reference per trie node. Instead, the child node is examined while remembering the stored prefix position and the corresponding parent trie node. The intent is to remember the last trie node T in the search path that contained a stored prefix, and the corresponding prefix position. When the search terminates (i.e., a trie node with a 0 set in the corresponding position of the external bit map is encountered), the result array corresponding to T at the position already computed is accessed to read off the next hop information.

FIG. 1D illustrates pseudo code of one implementation of the full tree bitmap search. It assumes a function treeFunction that can find the position of the longest matching prefix, if any, within a given node by consulting the internal bitmap. "LongestMatch" keeps track of a pointer to the longest match seen so far. The loop terminates when there is no child pointer (i.e., no bit set in external bit map of a node) upon which the lazy access of the result node pointed to by LongestMatch is performed to get the final next hop. The pseudo code assumes that the address being searched is already broken into strides and stride[i] contains the bits corresponding to the $i^{th}$ stride.

Keeping the stride constant, one method of reducing the size of each random access is to split the internal and external bitmaps, which is sometimes referred to as split tree bitmaps. This is done by placing only the external bitmap in each trie node. If there is no memory segmentation, the children trie nodes and the internal nodes from the same parent can be placed contiguously in memory. If memory segmentation exists, it is a bad design to have the internal nodes scattered across multiple memory banks. In the case of segmented memory, one option is for a trie node to have pointers to the child array, the internal node, and to the results array.

An alternative, as illustrated in FIG. 1E, has the trie node point at the internal node, and the internal node point at the results array. To make this optimization work, each child must have a bit indicating if the parent node contains a prefix that is a longest match so far. If there was a prefix in the path, the lookup engine records the location of the internal node (calculated from the data structure of the last node) as containing the longest matching prefix thus far. Then, when the search terminates, the corresponding internal node is accessed and then the results node corresponding to the internal node is accessed. Notice that the core algorithm accesses the next hop information lazily; the split tree algorithm accesses even the internal bit map lazily. What makes this work is that any time a prefix P is stored in a node X, all children of X that match P can store a bit saying that the parent has a stored prefix. The software reference implementation uses this optimization to save internal bit map processing; the hardware implementations use it only to reduce the access width size (because bit map processing is not an issue in hardware). A nice benefit of split tree bitmaps is that if a node contained only paths and no internal prefixes, a null internal node pointer can be used and no space will be wasted on the internal bitmap.

With this optimization, the external and internal bitmaps are split between the search node and the internal node respectively. Splitting the bitmaps in this way results in reduced node size which benefits hardware implementations. Each Search node $S_j$ has two pointers—one pointing to the children and the other to the internal node, $I_j$. The internal node $I_j$ maintains a pointer to the leaf array $LA_j$ of leaves corresponding to prefixes that belong to this node. For example, FIG. 1E illustrates search nodes S1 (111), S2 (112) and S3 (113), internal nodes I1 (121), I2 (115) and I3 (114), and leaf arrays LA1 (122), LA2 (116) and LA3 (123), and their interconnection by pointers. Additionally, leaf arrays LA1 (122), LA2 (116) and LA3 (123) respectively include leaf nodes L1 (122A), L2 (116A), and L3 (123A). Note, nodes illustrated in solid lines are the nodes accessed during a tree bitmap lookup example described hereinafter.

Now, consider the case where a lookup proceeds accessing search nodes S1 (111), S2 (112) and S3 (113). If the parent_has_match flag is set in S3 (113), this implies there is some prefix in one of the leaf nodes L2 (116A) in the leaf array LA2 (116) which is the current longest match. In this case, the address of internal node I2 (115) is saved in the lookup context. Now suppose that S3 (113) does not have paths extending from itself for this lookup. Then, there could be some prefix in leaf array LA3 (123) which is the longest matching prefix. Hence, I3 (114) is first accessed and its internal bitmap checked for a longest matching prefix. If no longest matching prefix is found, internal node I2 (115), whose address has been saved, is retrieved, its bitmap parsed, and leaf node L2 (116A) corresponding to the longest match is returned. The above access sequence is S1 (111), S2 (112), S3 (113), I3 (114), I2 (115), L2 (116A). This example shows that there are cases where two internal nodes need to be accessed and two internal bitmaps parsed before the longest match can be determined.

In hardware implementations, the memory access speeds are generally the bottleneck as opposed to node processing time. A typical implementation of a hardware based tree bitmap lookup engine uses multiple memory channels to store the tree bitmap data structure. In this case the tree bitmap nodes are spread out across the memory channels in such a way that per lookup, successive nodes accessed fall in different memory channels. If a single memory channel can sustain 'x' accesses per second, then with multiple lookups in progress simultaneously, 'x' lookups per second on average can be achieved provided each memory channel is accessed at most once per lookup. If any of the channels is accessed twice per lookup, then the packet forwarding rate drops by half because that particular channel becomes the bottleneck.

Another known approach for performing lookup operations is described in Wilkinson, III et al., U.S. Pat. No. 5,781,772, issued Jul. 14, 1998, which is hereby incorporated by reference. Willkinson, III et al., describes a previous system in which each node has an array of n number of pointers, wherein n is the number of possible next possible values that can occur in an input string. Additionally, Willkinson, III et al. describes uncompressed and compressed routing data structures.

In another known prior approach, sometimes referred to as "mtree" or "mtrie", the next child node of a parent node during a lookup operation is determined by an offset value corresponding to a next bit or stride of a lookup value from a common base pointer. Thus, if the next value is 138, the child node is located at base pointer +138× the size of a node. For 16 bit stride, this requires each parent node to have a unique, non-overlapping memory block of 64K entries (i.e., nodes) × the size of a node. This typically wastes a lot of space as these memory blocks are often sparsely populated. Moreover, each entry must be populated with the value of a node or an indication that no child node exists.

Additionally, none of these techniques includes an indication of the value of the node within the node itself. Rather, the value of the node is inherent based on the path taken to reach it. Moreover, this value of a node is typically not identified, maintained, nor used in determining whether the proper child node is reached. Desired are new methods, apparatus, data structures and/or other mechanisms for performing lookup operations.

SUMMARY

Inter alia, methods, apparatus, data structures, computer-readable medium, mechanisms, and means for programming routes and access control lists in comparison tree data structures and their use such as in performing lookup operations for use in routers, packet switching systems, and other devices. One embodiment identifies a parent node, the parent node including a first node value for indicating a path through a subtree from a root node to the parent node, and the parent node including a first base pointer. A child node of the parent node is added at a memory location based on the base pointer and a next stride value, the child node including a second node value including the first node value and the next stride value.

BRIEF DESCRIPTION OF THE DRAWINGS

The appended claims set forth the features of the invention with particularity. The invention, together with its advantages, may be best understood from the following detailed description taken in conjunction with the accompanying drawings of which:

FIGS. 1A-E are block diagrams or other illustrations of a known tree bitmap system;

DETAILED DESCRIPTION

Figure 1A:
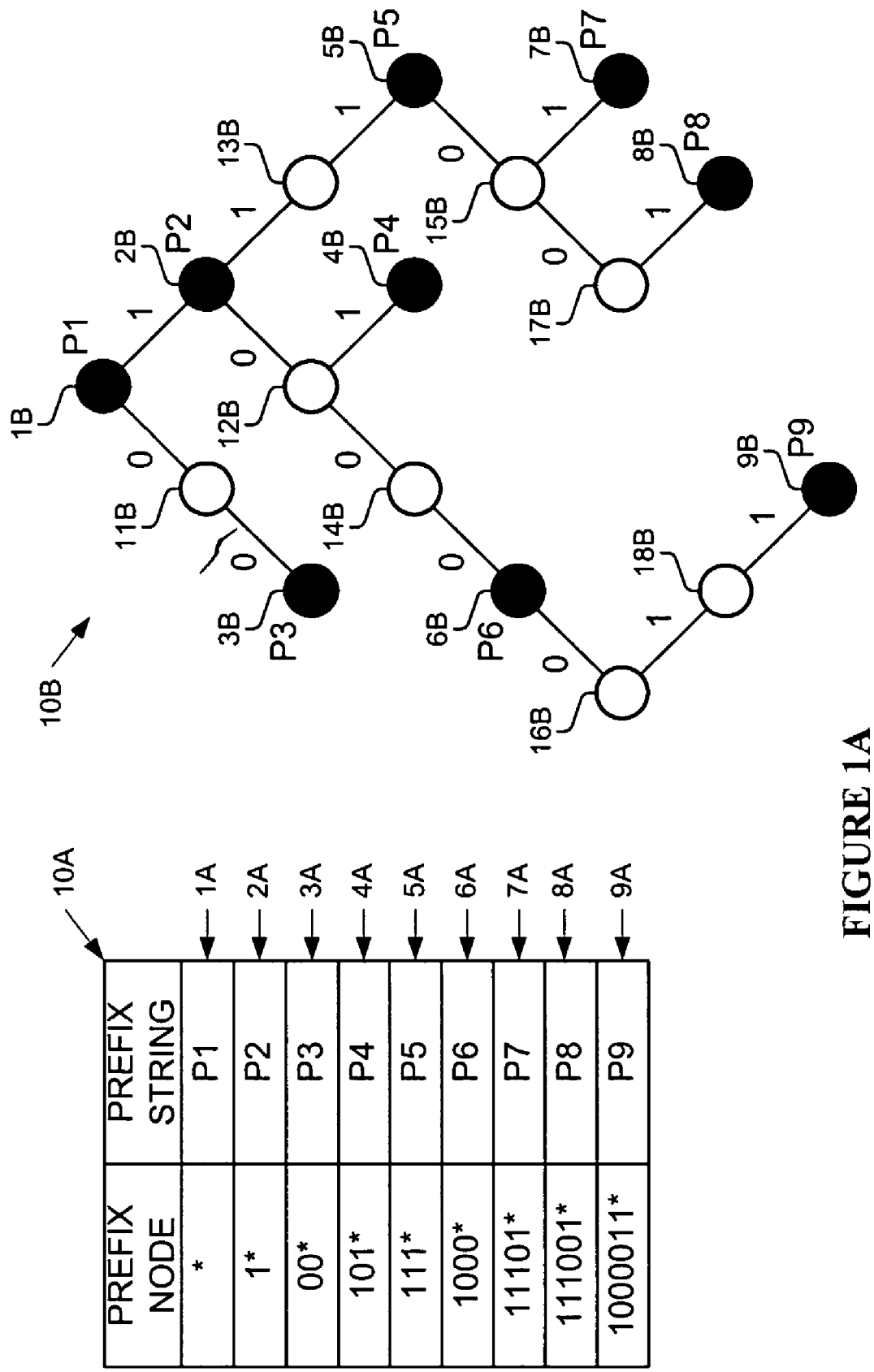
Figure 1B:
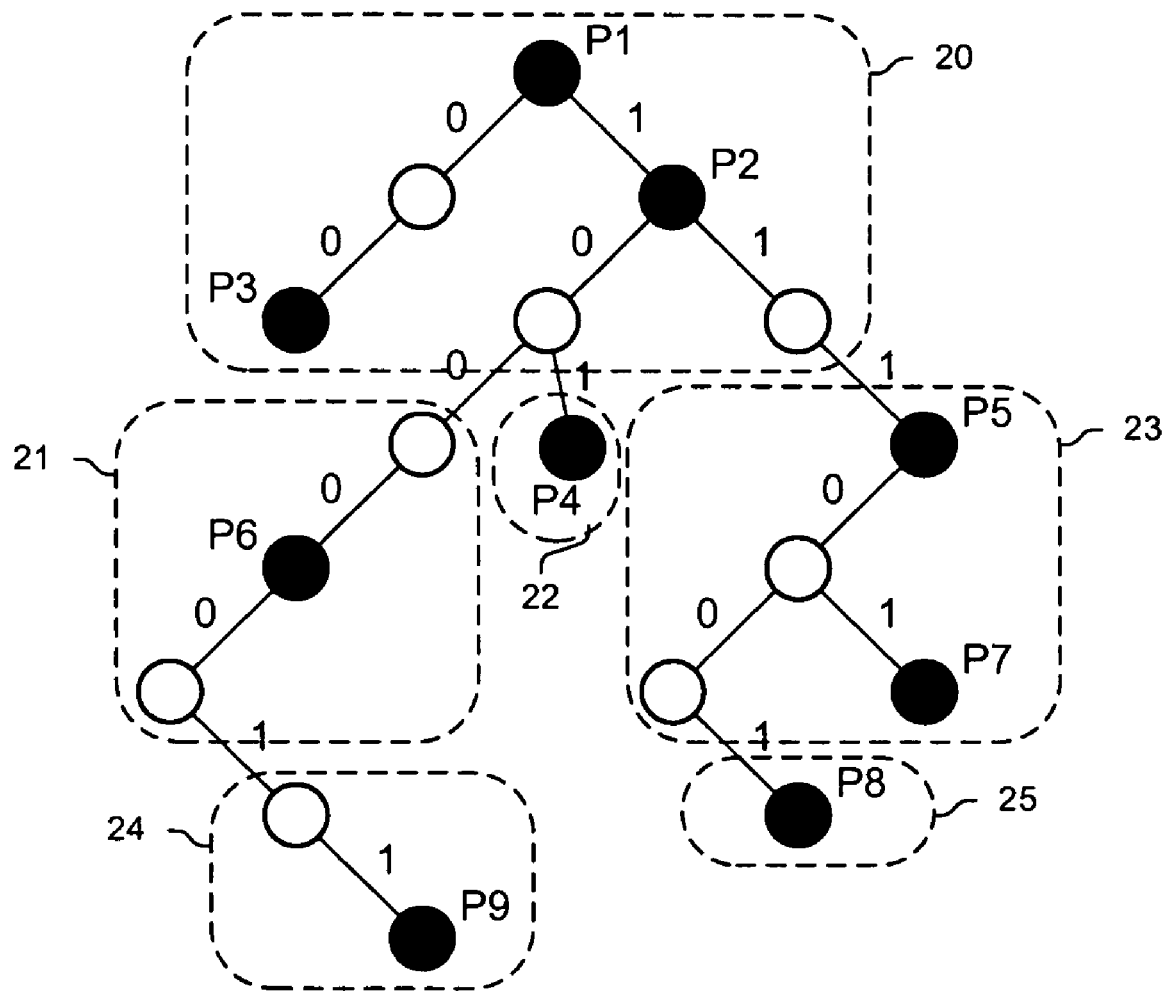
Figure 1C:
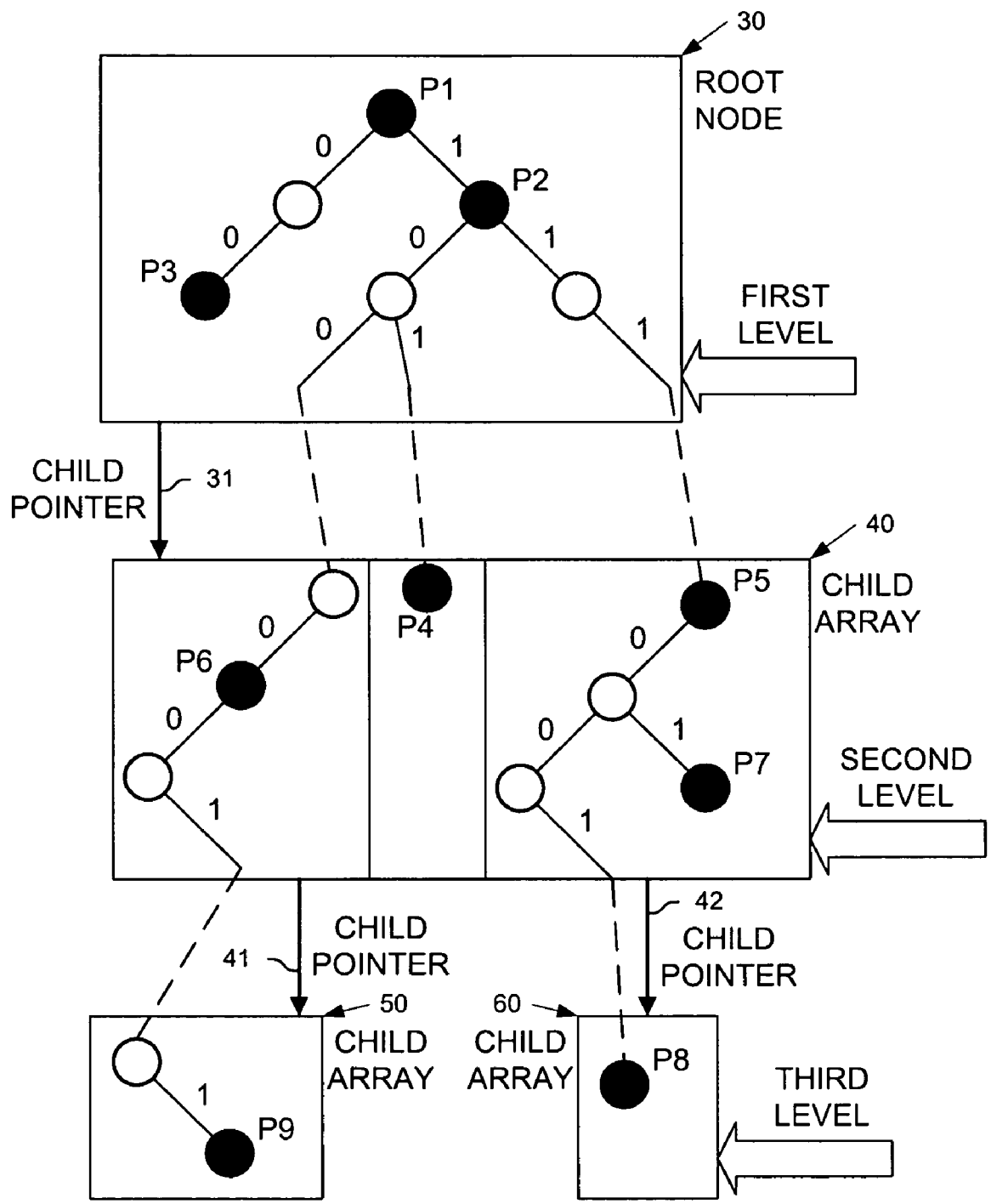
Figure 1E:
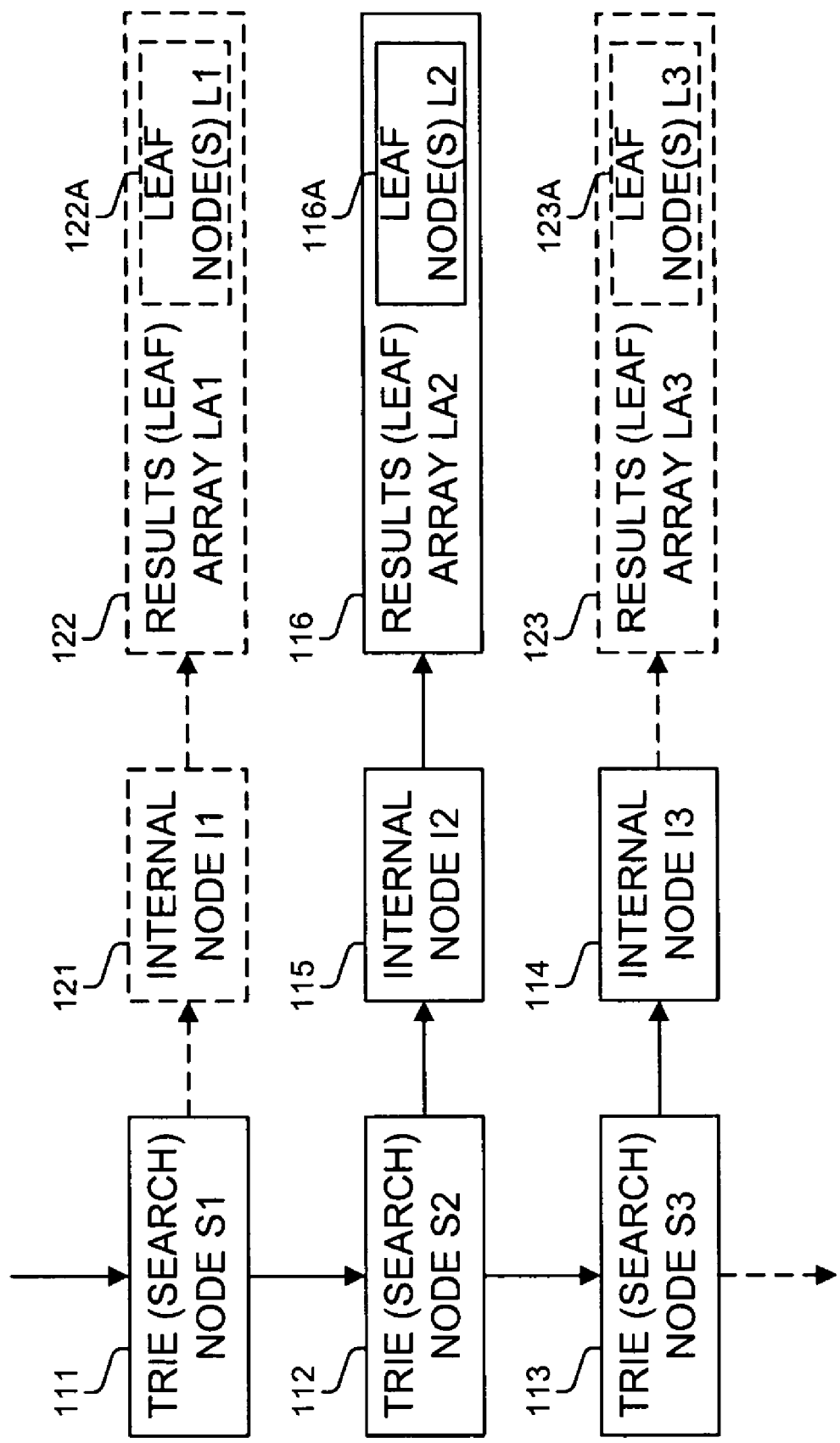

Inter alia, methods, apparatus, data structures, computer-readable medium, mechanisms, and means for performing lookup operations are disclosed. One embodiment of the invention especially relates to communications and computer systems; and more particularly, one embodiment relates to comparison tree data structures and their use, such as, but not limited to performing lookup operations for use in routers, packet switching systems, and other devices Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable medium containing instructions. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or identification of a packet. Moreover, these packets may contain one or more types of information, including, but not limited to, voice, data, video, and audio information. The term "item" is used generically herein to refer to a packet or any other unit or piece of information or data, a device, component, element, or any other entity. The phrases "processing a packet" and "packet processing" typically refer to performing some steps or actions based on the packet contents (e.g., packet header or other fields), and such steps or action may or may not include modifying, storing, dropping, and/or forwarding the packet and/or associated data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may be performed in the same or in a different serial or parallel ordering and/or by different components and/or processes, threads, etc., and/or over different connections and be combined with other functions in other embodiments in keeping within the scope and spirit of the invention. Furthermore, the term "identify" is used generically to describe any manner or mechanism for directly or indirectly ascertaining something, which may include, but is not limited to receiving, retrieving from memory, determining, defining, calculating, generating, etc.

Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc.

The term "storage mechanism" includes any type of memory, storage device or other mechanism for maintaining instructions or data in any format. "Computer-readable medium" is an extensible term including any storage mechanism that tangibly embodies computer-executable instructions or data. The term "memory" includes any random access memory (RAM), read only memory (ROM), flash memory, integrated circuits, and/or other memory components or elements. The term "storage device" includes any solid state storage media, disk drives. diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc. The term "associative memory" is an extensible term, and refers to all types of known or future developed associative memories, including, but not limited to binary and ternary content addressable memories, hash tables, TRIE and other data structures, etc. Additionally, the term "associative memory unit" may include, but is not limited to one or more associative memory devices or parts thereof, including, but not limited to regions, segments, banks, pages, blocks, sets of entries, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular thing rather than just one (e.g., the use of the word "memory" typically refers to one or more memories without having to specify "memory or memories," or "one or more memories" or "at least one memory", etc.). Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. The term "subtree" is used to indicate all or less than all of a tree. Moreover, the term "or" is used herein to identify a selection of one or more, including all, of the conjunctive items.

Comparison tree data structures of particular use in performing lookup operations are disclosed. A data structure typically includes first and second elements of a subtree, the subtree including a root node. The first and the second elements each include: a node value field for indicating one or more paths from the root node through the subtree for reaching the respective first or second element. The first node also includes a next node indication for use in traversing to the second element. Additionally, one embodiment identifies a lookup value, wherein lookup value includes a first lookup path and a next portion of the lookup value. A first node including a first node value is identified, with the first node value. The first node value is compared with the first lookup path to identify that a matching child node has been identified.

In one embodiment, a node is retrieved using some addressing mechanism. The path taken to reach this node is known (e.g., is maintained in one or more state variables). A node value stored in the node is retrieved and compared to the path taken to see if they match; that is, whether they are equal or if any masks were used in reaching the node, whether the masked path equals the node value. Some nodes will additionally include a mask value which can be used to mask the last stride portion of the path taken to reach the node (and any parent portion of the path is masked with any previous masks with both compared to their corresponding portions of the node value to see if it is a matching node), to mask a next stride (e.g., portion) of the lookup value for use in determining a descendent node, or for another purpose.

One embodiment identifies a parent node, the parent node including a first node value for indicating a path through a subtree from a root node to the parent node, and the parent node including a first base pointer. A child node of the parent node is added at a memory location based on the base pointer and a next stride value, the child node including a second node value including the first node value and the next stride value.

In one embodiment, the child node is made a simple type node in response to identifying that the next stride does not include a mask. One embodiment identifies that the next stride is a prefix value and that a sibling node of the child node corresponds to the prefix value and an address different than the next stride value. One embodiment makes the child node a current mask type node in response to identifying that the sibling node of the child node corresponds to the prefix value and the different address.

One embodiment determines that the parent node includes a bitmap next type value. One embodiment updates the bitmap next type value based on the next stride value. One embodiment determines that the parent node includes a next mask value. One embodiment adds a bitmap next node type field to the parent node. One embodiment changes at least one sibling node of the child node to a bitmap current node type. One embodiment changes the parent node to a bitmap next node type. One embodiment changes at least one sibling node of the child node to a bitmap current node type.

One embodiment identifies a parent node, the parent node including a first node value for indicating a path through a subtree from a root node to the parent node, and the parent node including a first base pointer. A next stride value is identified and it is entirely masked. A no mask next value is added to the parent node in response to determining the next stride is entirely masked. One embodiment adds a no mask next value to at least one child node of the parent node.

One embodiment identifies a parent node, the parent node including a first node value for indicating a path through a subtree from a root node to the parent node. A next stride value is identified, the next stride including a masked value. One embodiment determines that one or more child nodes of the parent node correspond to the masked value and an address different than the next stride value. Multiple unique branches from the parent node based on the next stride value and said one or more child nodes are determined. Each of the unique braches are then processed to identify whether or not to update the tree data structure based on a next stride value corresponding to each of the unique branches.

One embodiment identifies a parent node, the parent node including a first node value for indicating a path through a subtree from a root node to the parent node, and the parent node including a first base pointer. A memory location for adding a child node based on the base pointer and a next stride value is determined. A second node is found at the memory location, with the second node including a second node value indicating a second path through the subtree from the root node to the second node. The second node value is determined not to match a node value including the first node value and the next stride value. In response, a new base pointer for the parent node of the node being added is determined, and the parent node is updated with the new base pointer. The child node is added at a memory location based on the new base pointer and the next stride value, the child node including a second node value including the first node value and the next stride value.

One embodiment identifies sibling nodes of the child node already in the tree and these siblings are moved to new memory locations relative to the new base pointer. One embodiment traverses the tree data structure in identifying the siblings of the child node. One embodiment uses a data structure different than the subtree to identify the siblings of the child node.

One embodiment identifies a new route to add to the tree data structure. A position within the tree data structure to add a node is identified. The node is added to the tree data structure, wherein the node is of a type from a group consisting of: next mask type node, current mask type node, current/next mask type node, no-match current type node, no-match next type node, current/no-match mask/pointer type node, and current/no-match child mask/pointer type node.

Figure 2A:
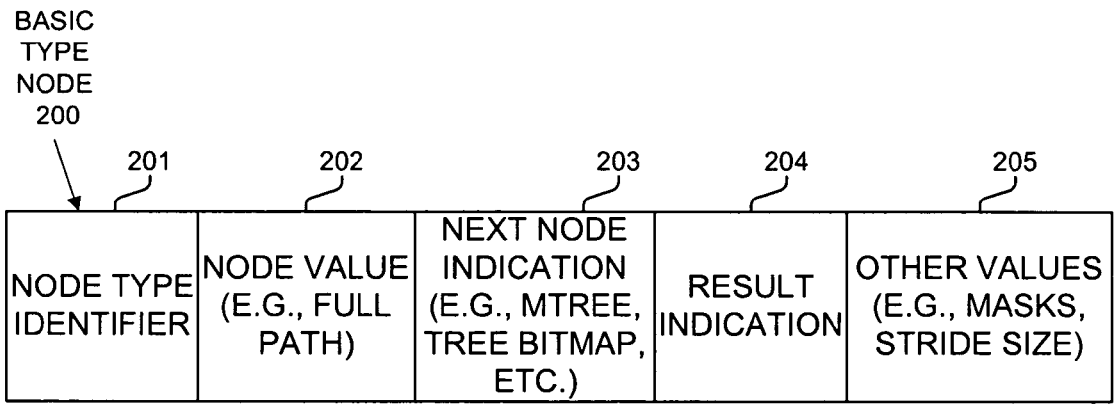
FIGS. 2A-F illustrate data structures, state values, and operations performed in performing a lookup operation in one embodiment.

FIG. 2A illustrates a basic type node 200 used in one embodiment. Node type 200 as shown includes a node type identifier field 201 for identifying the type of node, a node value field 202 for identifying the value of a node (e.g., identifies one or more paths through a tree to reach the particular node), a next node indication field 203 (e.g., mtrie, tree bitmap, one or more pointers or memory locations, or any other mechanism) for identifying one or more child nodes, a result indication field 204 for identifying zero or more results corresponding to the node, and possibly other value field(s) 205 (e.g., masks, stride size indications, etc.).

Figure 2B:
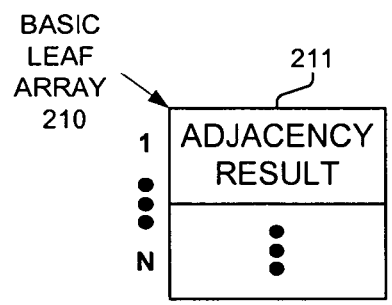

FIG. 2B illustrates a basic leaf array 210 used in one embodiment to identify the actual one or more adjacency results 211, which may indicate operations to perform (e.g., routing, access control, etc.). In one embodiment, result indication 204 (FIG. 2A) directly indicates one or more adjacency results; while in one embodiment, result indication 204 indicates a position within basic leaf array 210.

Figure 2C:
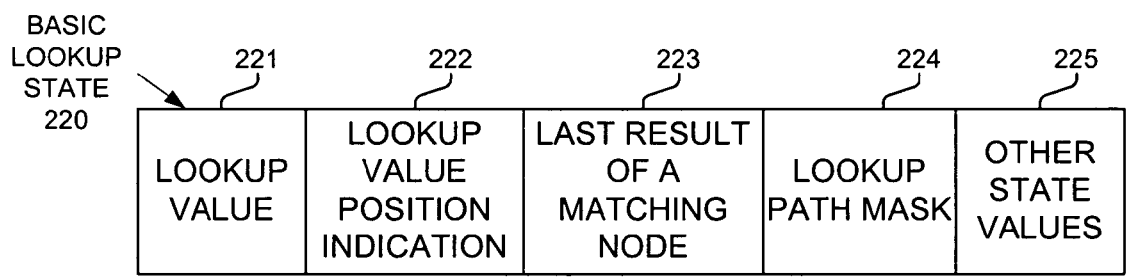

FIG. 2C illustrates a basic lookup state 220 used to maintain the state of a lookup operation. Of course, one embodiment uses more or less state values, and all, some or none of state values 221-225. As shown, basic lookup state 220 includes a lookup value 221 for indicating the value being looked up during the lookup operation; lookup value position indication 222 for indicating the current position (e.g., a bit, stride, or other position indication) within lookup value 221 corresponding to the progression of the lookup operation, a last result 223 of a matching node (e.g., corresponding to a result indication 204 or adjacency result 210), a lookup path mask 224 corresponding to a concatenation of mask values (including no mask indication) corresponding to the masks used (or not used) in reaching the current node, and optionally any other state values 225 which may be required by the one embodiment.

Figure 2D:
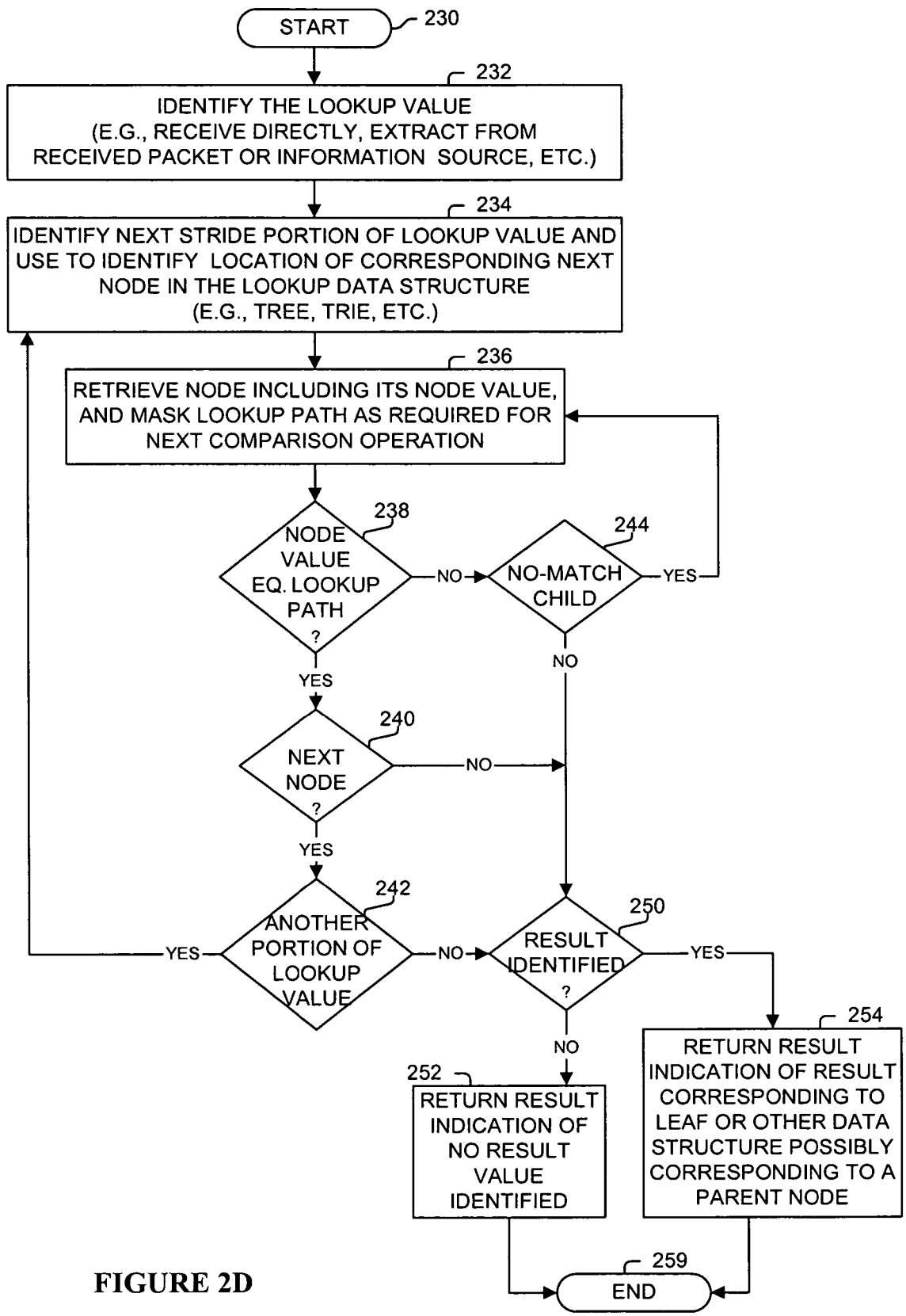

FIG. 2D illustrates a process used in one embodiment in performing a lookup operation. Processing begins with process block 230, and proceeds to process block 232 wherein the lookup value is identified, such as, but not limited to being derived from a received packet or other source. In one embodiment, the lookup value is directly received. Next, in process block 234, the next stride portion of the lookup value is identified, and used to identify the location of the corresponding next node (e.g., child node/element) in the lookup data structure (e.g., a tree, trie, etc.). Note, one embodiment uses the same addressing mechanism for all nodes in a tree data structure; while one embodiment uses multiple addressing mechanisms for accessing nodes in a data structure. In process block 236, the next node is retrieved. The next node typically includes a node value, although all nodes in the lookup data structure may or may not include the node value. Also, the lookup path used in reaching the current node (i.e., the next node) is masked using any corresponding masks in reaching the current node. In one embodiment, the last stride mask is included in the next node. In one embodiment, a state variable or other data structure maintains the lookup path and/or a masked version of the lookup path so the entire previous lookup path is not masked each time.

In process block 238, a comparison operation is performed to determine whether the node value matches (e.g., equals) the lookup path (e.g., the direct or masked lookup path depending on the data structure and masks used in reaching the current node). Note, there can be multiple paths through a tree to a node (depending on the embodiment and application) and using masking operations, this comparison operation will result in a match for each of these one or more paths taken to reach a valid child node.

As determined in process block 238, if the node value matches (e.g., equals) the lookup path (e.g., the direct or masked lookup path depending on the data structure and masks used in reaching the current node); then, in as determined in process blocks 240 and 242, if a next node is to be retrieved and there remains another portion of the lookup value, then processing returns to process block 234; otherwise processing proceeds to process block 250. As determined in process block 238, if there was not a match, then, as determined in process block 244, if the current node includes a no-match child indication or one is associated with the current node (e.g., based on a parent node, other indication in the data structure, or via any other mechanism), then processing returns to process block 236 to retrieve the corresponding no-match node; otherwise processing proceeds to process block 250.

As determined in process block 250, if a result has been identified (e.g., associated with the current node or a predecessor node), then in process block 254, this result is returned/identified. This result might be an operation, an indication or pointer into a leaf array, or any other indication. Otherwise, in process block 252, an indication of no result located is returned/identified. Processing is complete as indicated by process block 259.

Figure 2E:
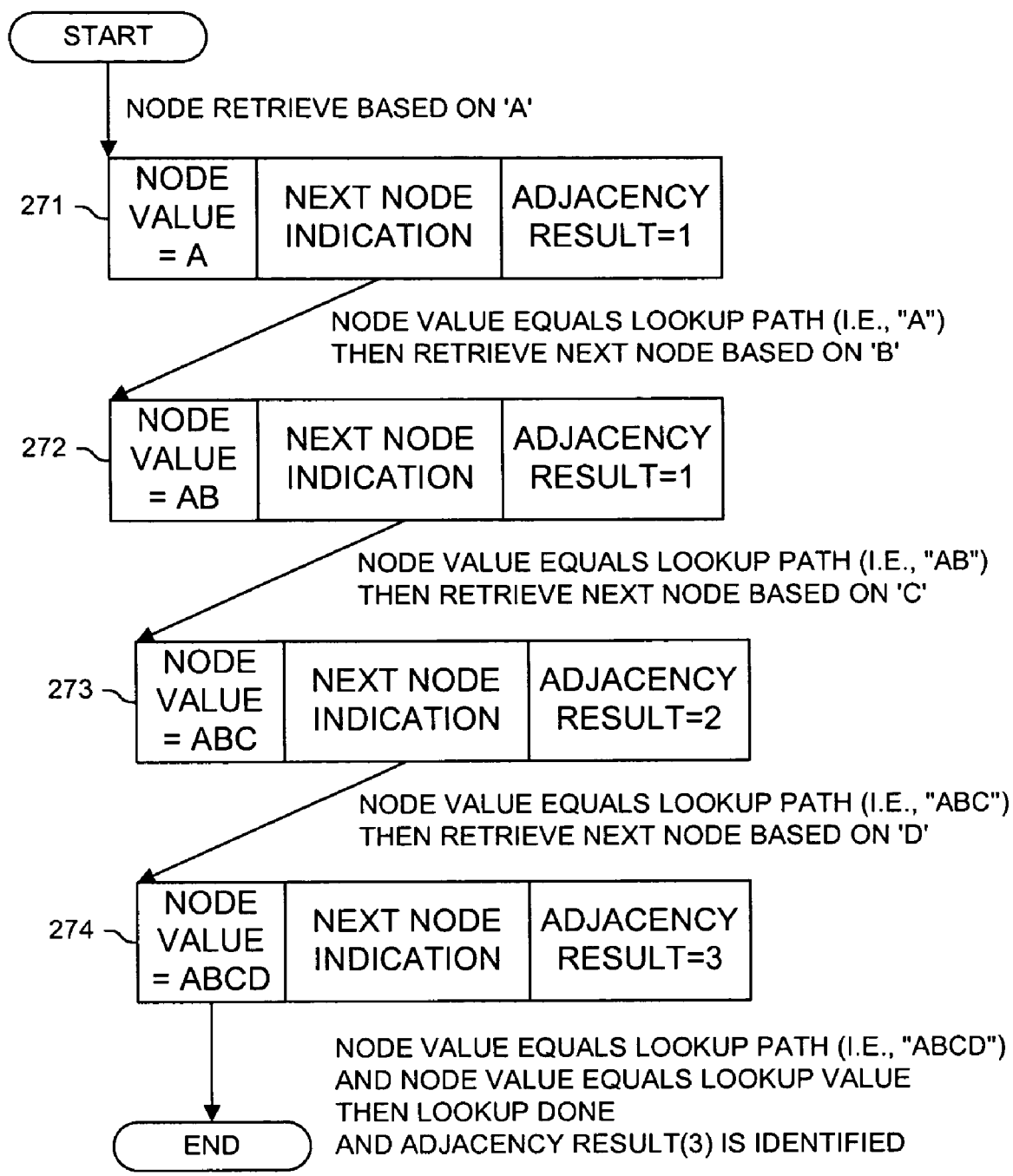

FIG. 2E illustrates a lookup operation performed by one embodiment based on a lookup value 270 of "ABCD", where each of these characters generically represents a stride of some value (e.g., one or more bits, octets, bytes, characters, etc., such as a portion of a network address, a port number, or any other value), which typically varies depending of the application (e.g., a routing lookup operation, an access control list operation, etc.), and a lookup value can have more or less than this number of strides. Four strides were merely chosen for simplicity of explanation.

As depicted, a first lookup operation retrieves node 271 based on the first stride value of "A" of lookup value 270. The node value of node 271 is compared to the lookup path (e.g., "A"), and as they are equal, the correct node was retrieved. Based on next node indication of node 271 and the second stride value "B" of lookup value 270, node 272 is retrieved. The node value of node 272 is compared to the lookup path (e.g., "AB"), and as they are equal, the correct node was retrieved. Based on next node indication of node 272 and the third stride value "C" of lookup value 270, node 273 is retrieved. The node value of node 273 is compared to the lookup path (e.g., "ABC"), and as they are equal, the correct node was retrieved. Based on next node indication of node 273 and the fourth stride value "D" of lookup value 270, node 274 is retrieved. The node value of node 274 is compared to the lookup path (e.g., "ABCD"), and as they are equal, the correct node was retrieved. As there are no more strides remaining in lookup value 270, the search is complete and the adjacency result (i.e., adjacency result three) indicated in node 274 is identified/returned. In one embodiment, such as that desired in producing a longest prefix match operation, the last identified adjacency result identified in a matching node would be returned, such as adjacency result two of parent node 273. In one embodiment, if a node does not contain an adjacency result, a corresponding no adjacency result value is identified/returned.

Figure 2F:
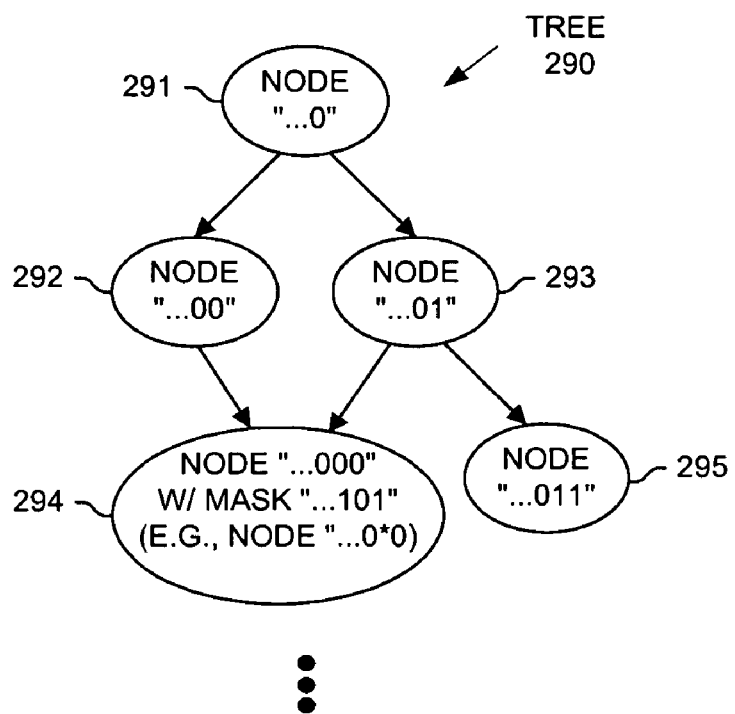

FIG. 2F provides an example of a tree 290 including nodes 291-295, which may be a subtree of another tree having other parent and/or descendent nodes and for simplicity of reader understanding, any previous lookup path portion is not shown, and nodes and parent lookup path values are represented by " . . . ". As shown, node 291 has a node value of " . . . 0", node 292 has a node value of " . . . 00" as it is the "0" extending path child of node 291, and node 293 has a node value of " . . . 01" as it is the "1" extending path child of node 291. Each of nodes 291-293 can verify that a correct node was retrieved by comparing its node value with the corresponding portion of the lookup value to see if they match. Node 294 is a child of both nodes 292 and 293, and therefore its node value is represented by " . . . 000" with mask " . . . 101" (thus, it matches both paths " . . . 000" and " . . . 010"). The node value is also sometimes denoted as " . . . 0*0", where "*" denotes either "0" or "1". Thus, there are at least two paths from the root of tree 290 to node 294. Also shown is node 295, which is the "1" path child of node 293. There is only one path from node 291 to node 295 and possibly to the root of tree 290 (e.g., if there is only one path to node 291 from the root of tree 290).

Figure 3A:
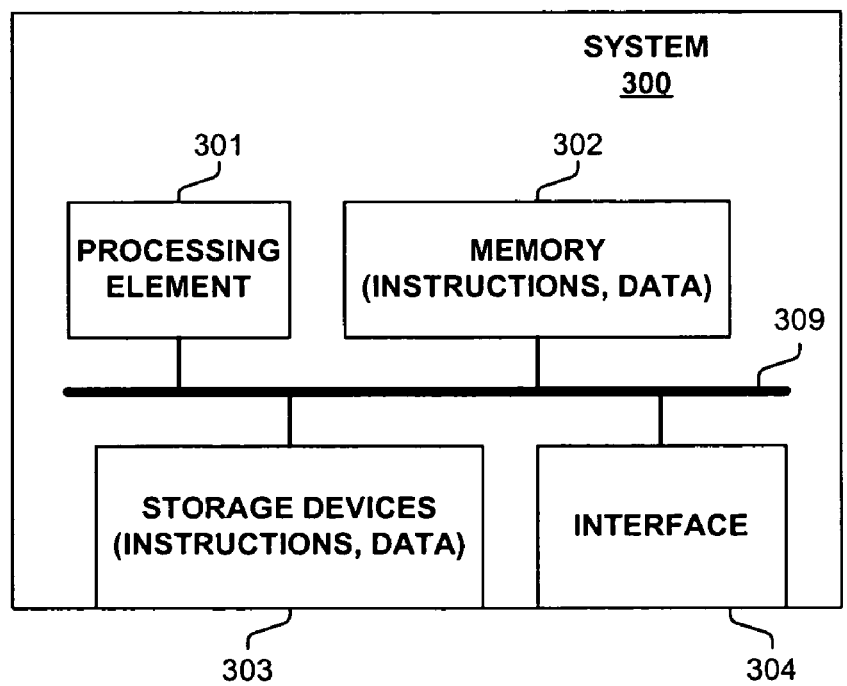
FIGS. 3A and 3B are block diagrams of two of an unlimited number of mechanisms used by embodiments in performing a lookup operation.

FIG. 3A is a block diagram of one embodiment of a computer or communications mechanism 300, which performs lookup operations and/or includes data structures as disclosed herein. In one embodiment, mechanism 300 includes a processing element 301, memory 302, storage devices 303, and interfaces 304 for communicating with other entities (e.g., nodes, components, devices, etc.), which are typically coupled via one or more communications mechanisms 309 (shown as a bus for illustrative purposes). Various embodiments of a computer or communications mechanism may include more or less elements. In one embodiment, one or more comparison tree or other data structures used in performing lookup operations are stored in memory 302, and the lookup operation is controlled by processing element 301, such as using one or more processes corresponding to the flow diagrams illustrated herein, variants thereof, or any other process of an embodiment.

The operation of communications mechanism 300 is typically controlled by processing element 301 using memory 302 and storage devices 303 to perform one or more tasks or processes. Memory 302 is one type of computer-readable medium, and typically comprises random access memory (RAM), read only memory (ROM), flash memory, integrated circuits, and/or other memory components. Memory 302 typically stores computer-executable instructions to be executed by processing element 301 and/or data which is manipulated by processing element 301 for implementing functionality in accordance with the invention. Storage devices 303 are another type of computer-readable medium, and typically comprise solid state storage media, disk drives, diskettes, networked services, tape drives, and other storage devices. Storage devices 303 typically store computer-executable instructions to be executed by processing element 301 and/or data which is manipulated by processing element 301 for implementing functionality in accordance with the invention.

Figure 3B:
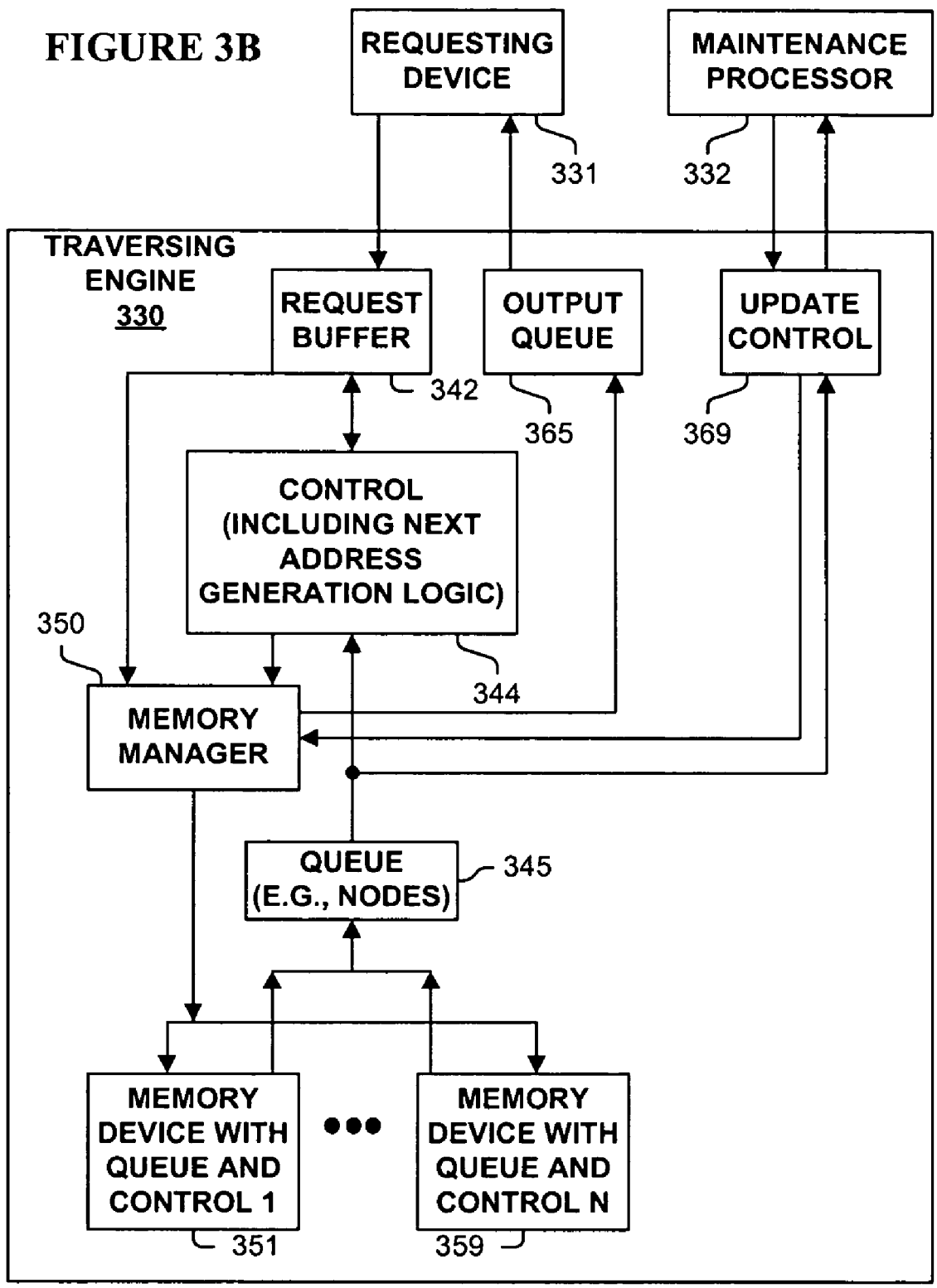

FIG. 3B illustrates a block diagram of one embodiment for traversing a comparison tree data structure, including, but not limited to using tree bitmap, mtree, variants thereof, or any other mechanism to identify child nodes (e.g., identifying their addresses in memory or other storage mechanism). A requesting device 331, such as a processor or other control logic, generates lookup requests that are received by traversing engine 330, and stores them in request buffer 342. Maintenance processor 332 programs traversing engine 330 via update control 369 with one or more comparison tree and/or other data structures, as traversing engine can simultaneously be used to perform searches on multiple and even independent comparison tree and/or other data structures. In one embodiment, requesting device 331 and/or maintenance processor correspond to system 300 (FIG. 3A). In one embodiment, requesting device 331 and/or maintenance processor 332 are included in traversing engine 330.

In one embodiment, traversing engine 330 includes a request buffer 342 to receive and buffer search requests, a memory manager 350 to control read and write operations to memory device and control 351-359, with results being directed, via queue 345, to control 344 including comparison tree next address logic or to output queue 365. Output queue 365 communicates search results to requesting device 331. Comparison tree next address logic 344 processes search requests received from request buffer 342 and intermediate results received from memory devices and controls 351-359 via queue 345, and possibly determines the memory address of the next node and forwards the memory read request to memory manager 350. In one embodiment, there is no queue 345.

Search requests received or generated by traversing engine 330 may include a full or partial lookup value, based on which, traversing engine 330 will find a longest matching prefix (e.g., which is particularly useful for routing operations), exact match (e.g., which is particularly useful for routing, access control, and other operations), or another result. For example, in one embodiment, traversing engine 330 includes the ability to search based on a first portion of a lookup string, return a result, and then continue the search from where it left off based on the result and an additional portion of the lookup string. In addition, in one embodiment, traversing engine 330 will continue to search through the data structure until a result is received, search data is exhausted, or a stop node (described further hereinafter) is encountered.

Figure 4A:
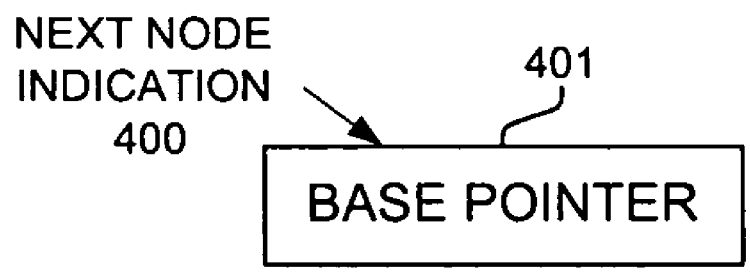
FIGS. 4A-4G illustrate mechanisms used in one embodiment for identifying a child node of a parent node and how different sets of child nodes of different parents (or other groupings of nodes) can be stored in a same block of memory.

FIG. 4A-4G illustrate a mechanism used in one embodiment for identifying a child node of a parent node and how different sets of child nodes of different parents (or other groupings of nodes) can be stored in a same block of memory. As depicted in FIG. 4A, in one embodiment, a next node indication 400 corresponds to a base pointer 401. Note, in one embodiment, a next node indication corresponds to a tree bitmap data structure, a compressed or uncompressed set of one or more pointers or other data structures, or any other mechanism.

Figure 4B:
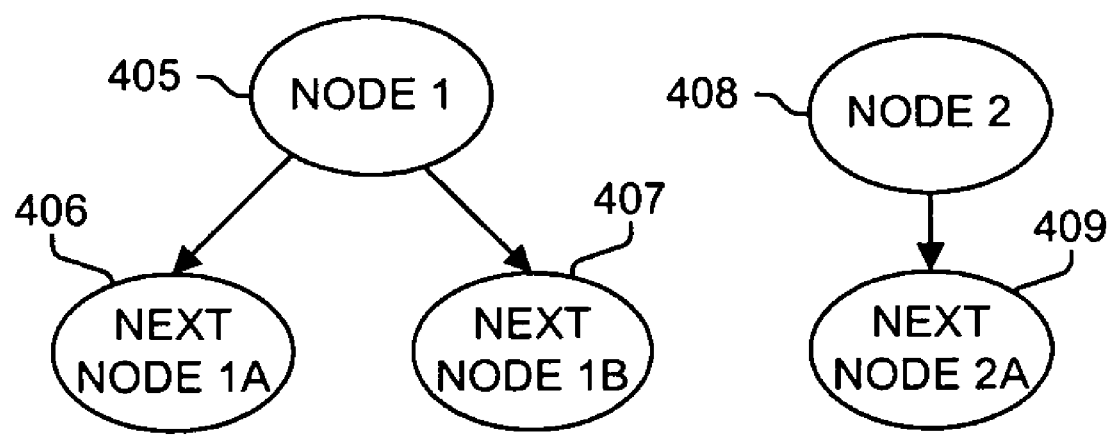

FIG. 4B provides an example illustration of a node 1 (405) having child nodes of next node 1A (406) and next node 1B (407), and a node 2 (408) have a child node of next node 2A (409).

Figure 4C:
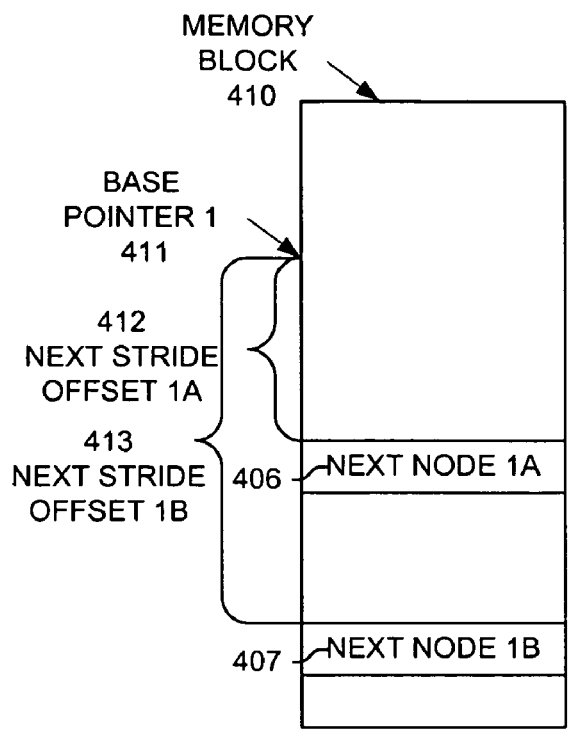

FIG. 4C illustrates a memory block 410 including next nodes 1A (406) and 1B (407) and their locations in contiguous memory block 410. Next nodes 1A (406) and 1B (407) can be located relative to a base pointer 1 (411), typically identified in node 1 (406) (FIG. 4B), from their corresponding next stride offset values of 412 and 413.

Figure 4D:
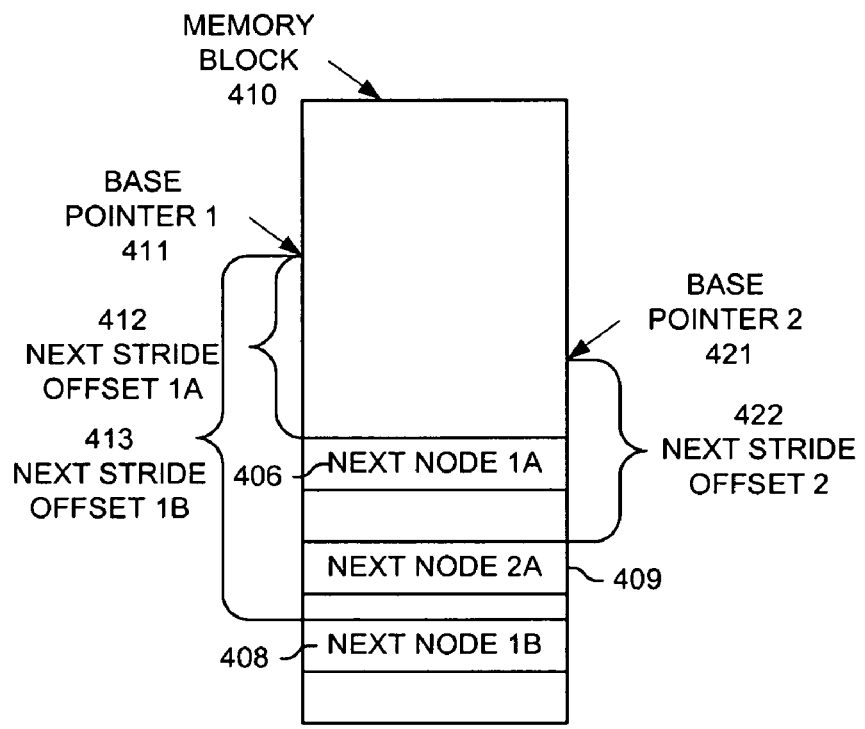

FIG. 4D illustrates another storage of nodes in contiguous memory block 410. Next nodes 1A (406) and 1B (407) are stored as described in FIG. 4B. Additionally, in the same memory block 410, next node 2A (409) is stored relative (i.e., by next stride offset 422) to a second base pointer 421, which is typically identified in node 2 (408) (FIG. 4B). In one embodiment, base pointers 411 and 421 indicate different positions within memory block 410. In one embodiment, base pointers 411 and 421 indicate the same position within memory block 410. In one embodiment, base pointers 411 and 421 refer to a single base pointer. As the nodes typically contain a value (e.g., a valid path for reaching the node), a comparison operation can be performed to identify that a valid child node of the parent node was retrieved, and not that of another one or more parent node nodes sharing the memory block. Also, there can be multiple paths through a tree to a node and using masking operations, this comparison operation will result in a match for each of these one or more paths taken to reach a valid child node.

Figure 4E:
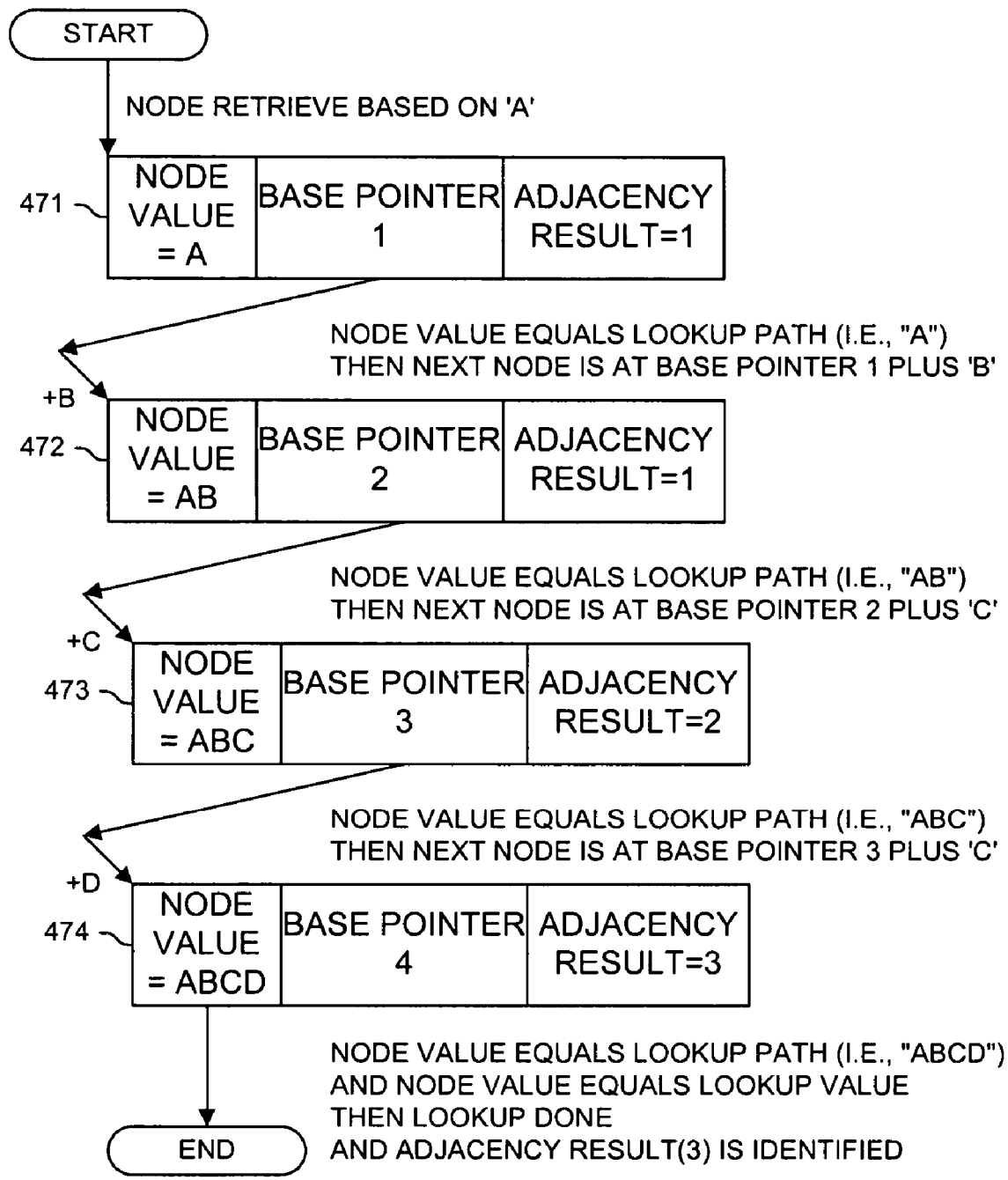

FIG. 4E illustrates a lookup operation performed by one embodiment based on a lookup value 470 of "ABCD", where each of these characters generically represents a stride of some value (e.g., one or more bits, octets, bytes, characters, etc., such as a portion of a network address, a port number, or any other value), which typically varies depending of the application (e.g., a routing lookup operation, an access control list operation, etc.), and a lookup value can have more or less than this number of strides. Four strides were merely chosen for simplicity of explanation As depicted, a first lookup operation retrieves node 471 based on the first stride value of "A" of lookup value 470 (e.g., based on strict offset addressing or any other mechanism). The node value of node 471 is compared to the lookup path (e.g., "A"), and as they are equal, the correct node was retrieved. Based on the base pointer (i.e., next node) indication of node 471 and the second stride value "B" of lookup value 470, node 472 is retrieved by adding the value (or a corresponding value) of B to the base pointer. The node value of node 472 is compared to the lookup path (e.g., "AB"), and as they are equal, the correct node was retrieved. Based on the base pointer (i.e., next node) indication of node 472 and the third stride value "C" of lookup value 470, node 473 is retrieved by adding the value (or a corresponding value) of C to the base pointer. The node value of node 473 is compared to the lookup path (e.g., "ABC"), and as they are equal, the correct node was retrieved. Based on the base pointer (i.e., next node) indication of node 473 and the fourth stride value "D" of lookup value 470, node 474 is retrieved by adding the value (or a corresponding value) of D to the base pointer. The node value of node 474 is compared to the lookup path (e.g., "ABCD"), and as they are equal, the correct node was retrieved. As there are no more strides remaining in lookup value 470, the search is complete and the adjacency result (i.e., adjacency result three) indicated in node 474 is identified/returned. In one embodiment, such as that desired in producing a longest prefix match operation, the last identified adjacency result identified in a matching node would be returned, such as adjacency result two of parent node 473. In one embodiment, if a node does not contain an adjacency result, a corresponding no adjacency result value is identified/returned.

Figure 4F:
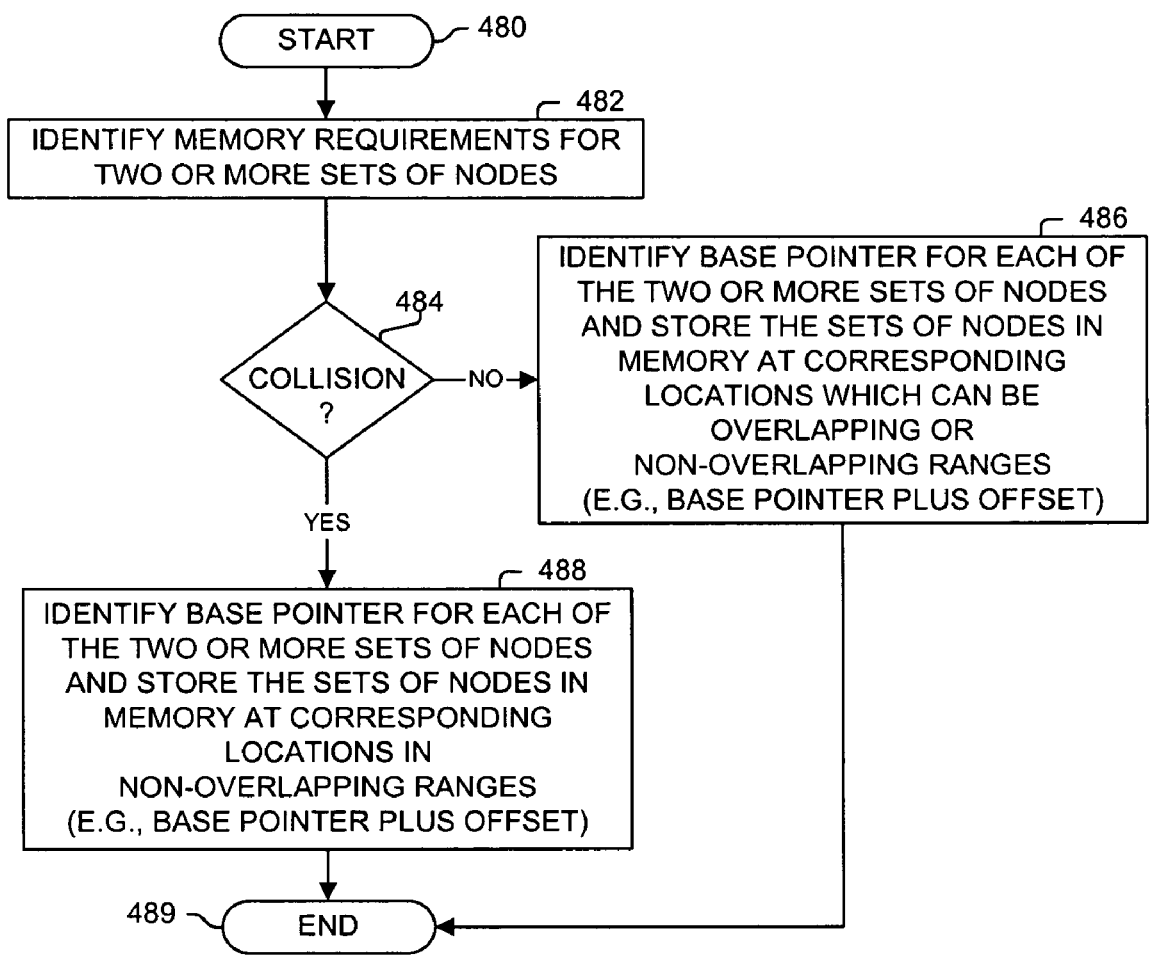

FIG. 4F illustrates a process used in one embodiment in determining where to store children of a node. Processing begins with process block 480, and proceeds to process block 482, wherein the memory storage requirements are determined for two or more sets of nodes (e.g., all to be stored, one or more already stored, etc.). As determined in process block 484, if there is a collision between the storage requirements of the two sets of nodes (possibly with trying various locations of the base pointer for the set or sets to be stored, then processing proceeds to process block 488, wherein the two different sets of nodes are stored in non-overlapping memory ranges, either in a same or different block of memory. Otherwise, as indicated in process block 486, the two or more sets of ranges can be stored in a same overlapping block of memory addresses, and are stored in an overlapping or non-overlapping block or blocks of contiguous memory addresses. Processing is complete as indicated by process block 489.

Figure 4G:
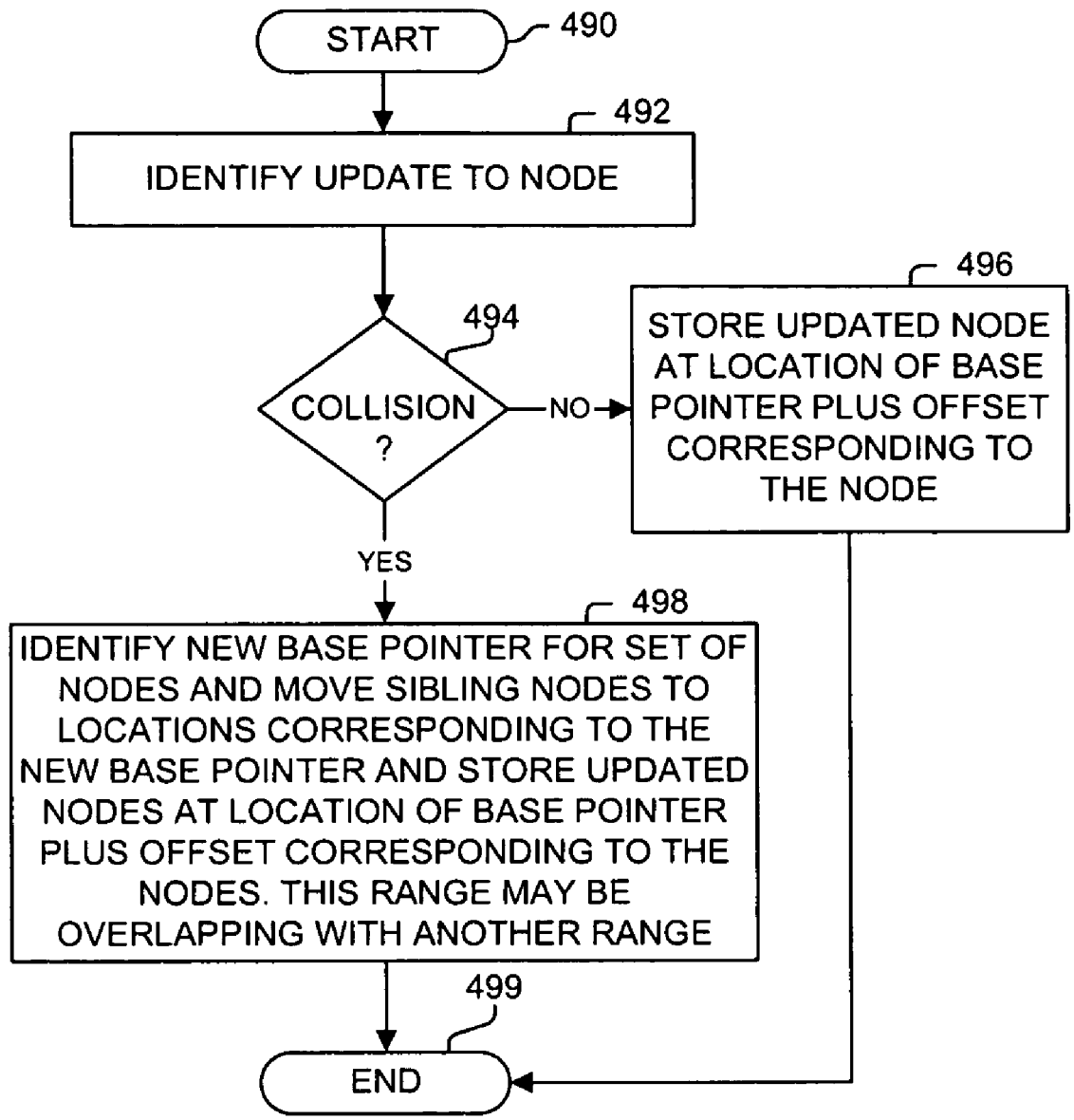

FIG. 4G illustrates a process used in one embodiment used in determining where to store a new node in a previously stored set of nodes. Note, typically sibling nodes (e.g., nodes who are at a same tree level with a common parent or possibly a different parent when using masks) are stored using a same base pointer. The new node can be stored if it is to be stored in a non-overlapping region. Otherwise, care must be taken to ensure that there is no collision with another node. If there is, the base pointer must be moved such that the associated nodes do not collide with other nodes.

Processing begins with process block 490, and proceeds to process block 492, wherein the node to update is determined. Next, as determined in process block 494, if the storage of the node relative to its base pointer will cause a collision, then processing proceeds to process block 498 to redefine the base pointer and its associated nodes (e.g., siblings), or possibly the base pointer/associated nodes corresponding to the already stored colliding node is updated/moved. Note, these moved nodes could be stored in an overlapping or non-overlapping contiguous block of memory shared with one or more other sets of nodes. Otherwise, there is no collision, and the node is stored relative to its base pointer in process block 496. Processing is complete as indicated by process block 499.

FIGS. 5A-D, 6A-6D, and 7A-7C illustrate a few of an unlimited number of node types and their operation, of which all, some, or none may be used by one embodiment. Note, not all fields of the node types are shown; rather, illustrated are fields and steps used in verifying that it is the correct node and for identifying the next level (e.g., child) node. For example, one embodiment uses a node type field in some or all nodes such as node type identifier field 201 (FIG. 2A). Additionally, one embodiment typically includes a result indication field 204 in some or all nodes. Moreover, one embodiment varies the stride size at different levels, and thus includes a stride size indication of a next level node in a state variable, parent node, or any other means or mechanism, including being inherent in the programming of the lookup operation the stride size at each level or after a certain type of node, etc.

Figure 5A:
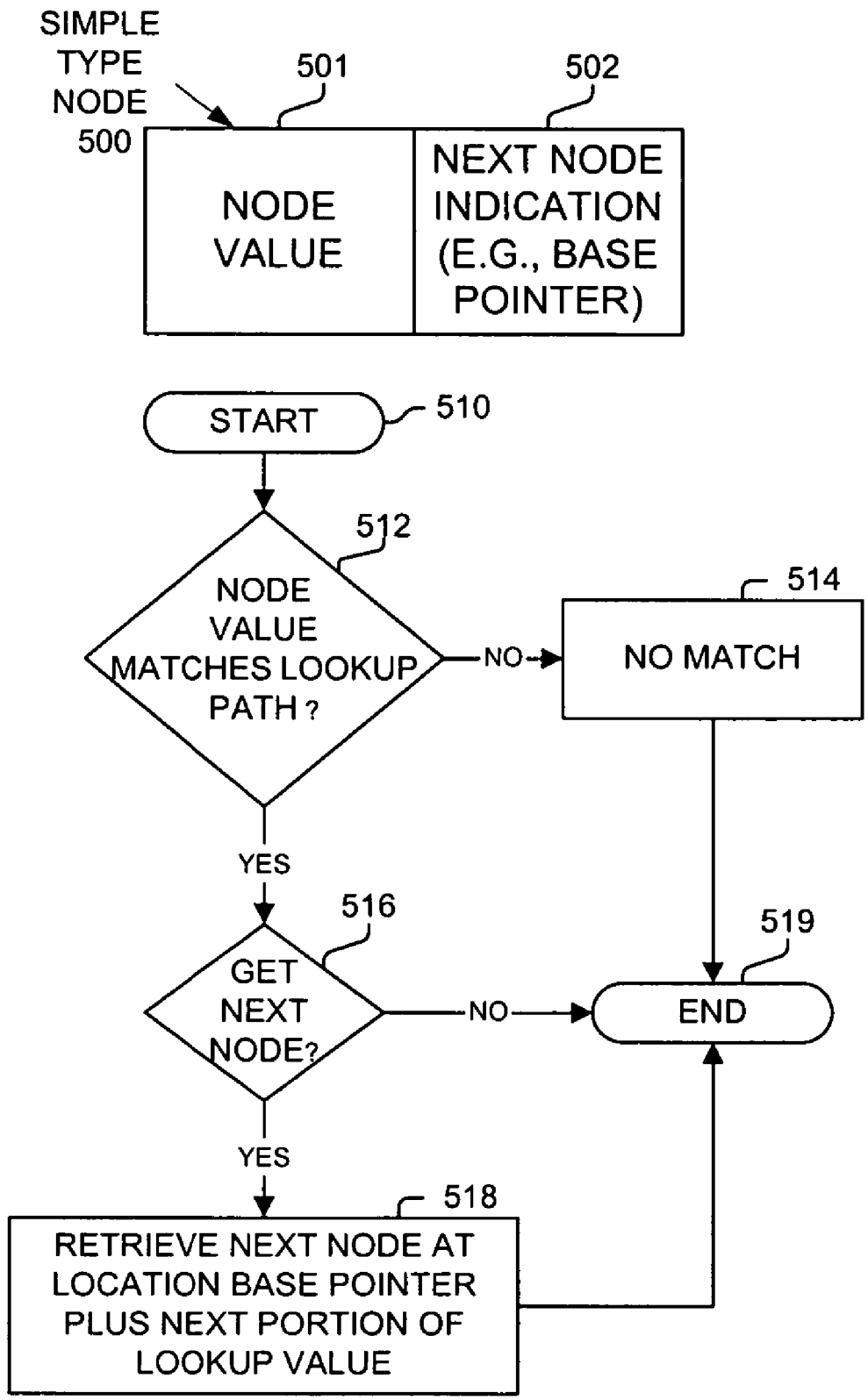
FIGS. 5A-D, 6A-6D, and 7A-7C illustrate a few of an unlimited number of node types and their operation, of which all, some, or none may be used by one embodiment.

FIG. 5A illustrates a simple type node 500 used in one embodiment. As shown, simple node type node 500 includes a node value field 501 and a next node indication field 502, such as, but not limited to a base pointer, tree bitmap, mtree, or any other mechanism for identifying a next level node.

The processing of a simple node type node 500 as performed in one embodiment is shown in the corresponding flow diagram. Processing begins with process block 510. As determined in process block 512, if the node value matches the lookup path (e.g., equals; or if a mask was used in reaching a parent node, then equals the masked parent portion concatenated with the current stride portion of the lookup path), then a valid node has been retrieved. Then, as determined in process block 516, if a next node is to be retrieved (e.g., a valid or non-null next node indication and more strides remaining in the lookup path), then the next (e.g., child) node is identified and retrieved in process block 518 based on the next node indication 502 and the next portion (e.g., stride) of the lookup value, such as, but not limited to adding the next portion to the base pointer. Otherwise, a valid node was not retrieved, and no match is indicated in process block 514. Processing is complete as indicated by process block 519.

Figure 5B:
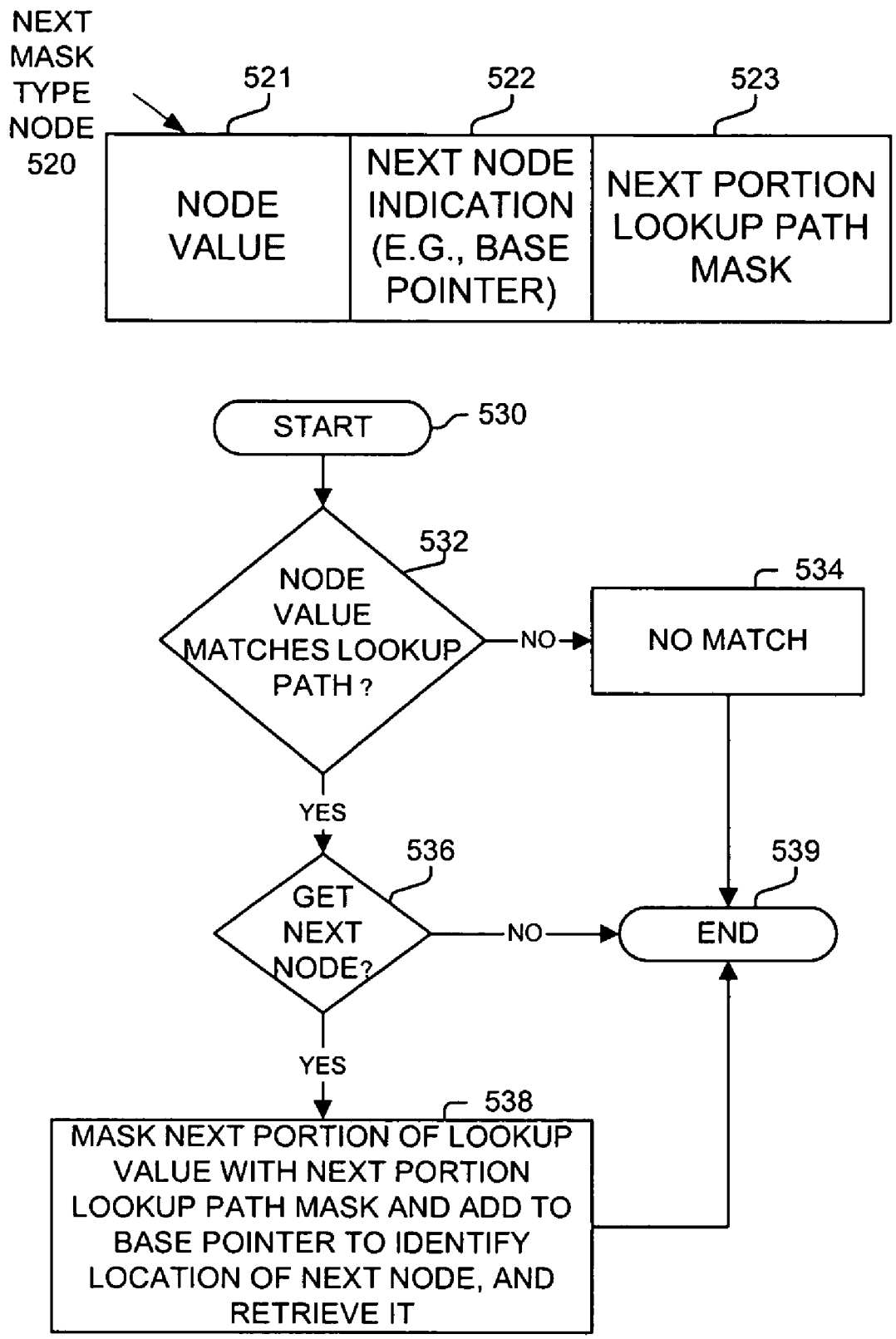

FIG. 5B illustrates a next mask node type node 520 used in one embodiment. As shown, next mask node type node 520 includes a node value field 521; a next node indication field 522, such as, but not limited to a base pointer, tree bitmap, mtree, or any other mechanism for identifying a next level node; and a next portion lookup path mask field 523.

The processing of a next mask node type node 520 as performed in one embodiment is shown in the corresponding flow diagram. Processing begins with process block 530. As determined in process block 532, if the node value matches the lookup path (e.g., equals; or if a mask was used in reaching a parent node, then equals the masked parent portion concatenated with the current stride portion of the lookup path), then a valid node has been retrieved. Then, as determined in process block 536, if a next node is to be retrieved (e.g., a valid or non-null next node indication and more strides remaining in the lookup path), then the next (e.g., child) node is identified and retrieved in process block 538 based on the next node indication 522 and the next portion (e.g., stride) of the lookup value masked with the next portion lookup path mask 523, such as, but not limited to adding the masked next portion to the base pointer. Otherwise, a valid node was not retrieved, and no match is indicated in process block 534. Processing is complete as indicated by process block 539.

Figure 5C:
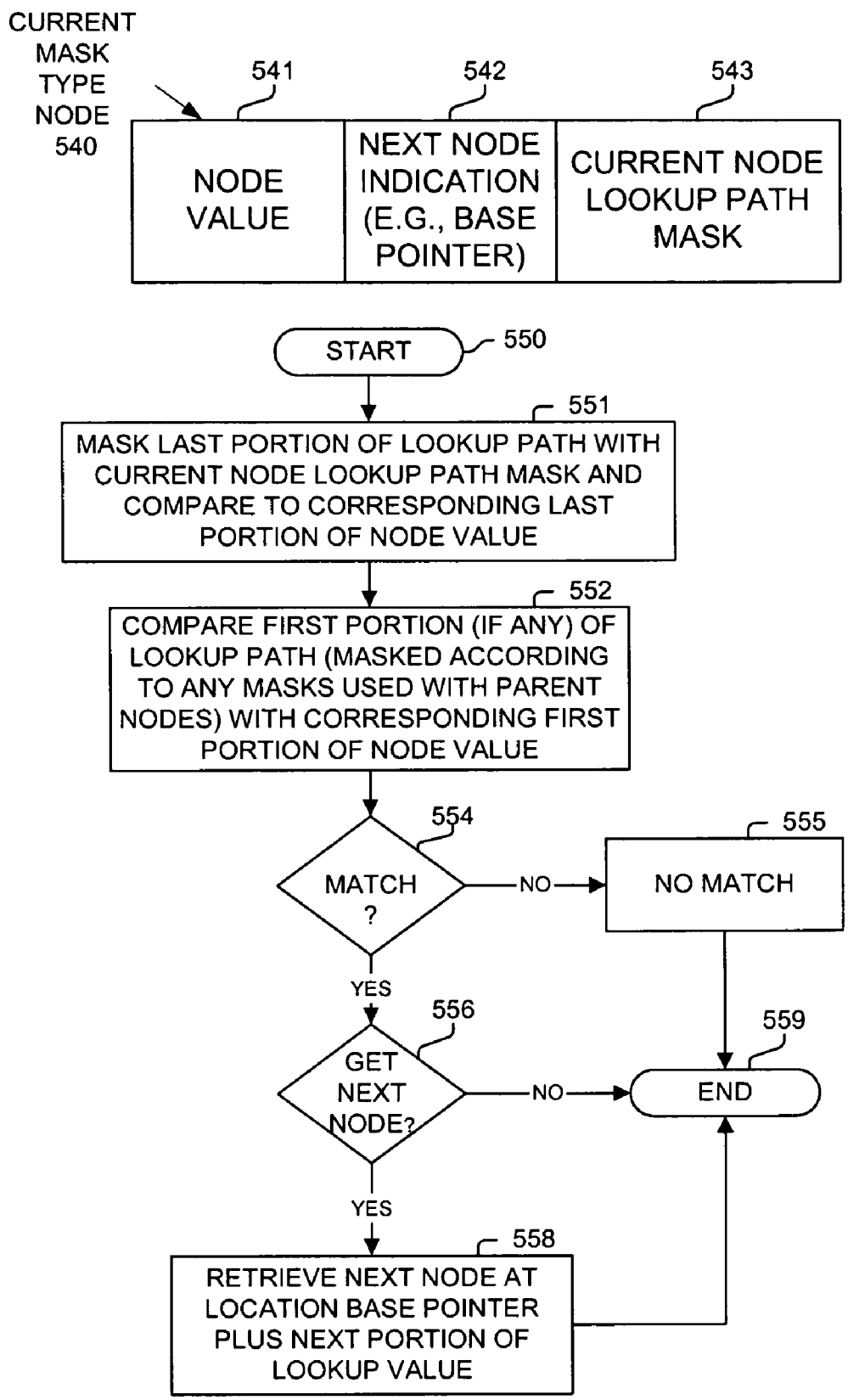

FIG. 5C illustrates a current mask type node 540 used in one embodiment. One use of the current mask type node 540 is that of a child node of a node that uses a mask in identifying its child node, as current mask type node 540 uses a mask in determining if it was the correctly identified child-node.

As shown, current mask type node 540 includes a node value field 541; a next node indication field 542, such as, but not limited to a base pointer, tree bitmap, mtree, or any other mechanism for identifying a next level node; and a current node lookup path mask field 543.

The processing of a current mask type node 540 as performed in one embodiment is shown in the corresponding flow diagram. Processing begins with process block 550. In process block 551, the last portion (i.e., stride) of the lookup path is masked with the current node lookup path mask 543 and compared to the corresponding last (stride) portion of the node value 541. In process block 552, the first portion of the lookup path (i.e., that prior to the last stride portion) is masked if according to any previously used masks and compared to the first portion of the node value 541.

As determined in process block 554, if both of these parts of the determination whether the node is a valid node results in a match, then a valid node has been retrieved. Then, as determined in process block 556, if a next node is to be retrieved (e.g., a valid or non-null next node indication and more strides remaining in the lookup path), then the next (e.g., child) node is identified and retrieved in process block 558 based on the next node indication 542 and the next portion (e.g., stride) of the lookup value, such as, but not limited to adding the next portion to the base pointer. Otherwise, a valid node was not retrieved, and no match is indicated in process block 555. Processing is complete as indicated by process block 559.

Figure 5D:
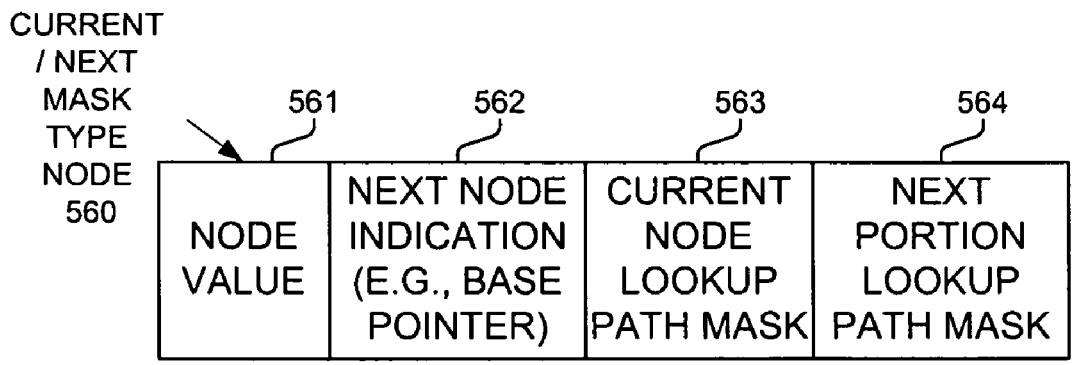
Figure 5D:
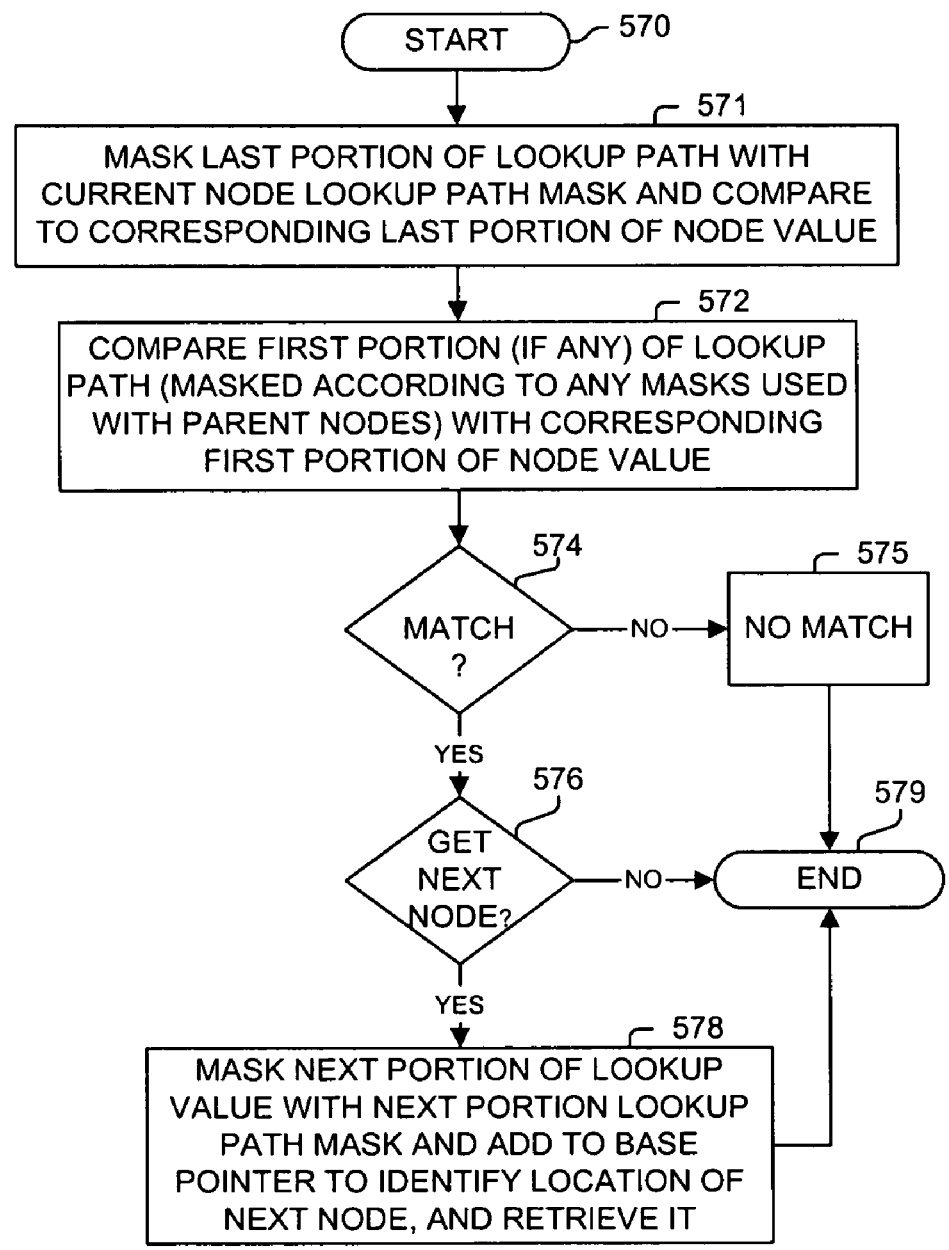

FIG. 5D illustrates a current/next mask type node 560 used in one embodiment. One use of the current/next mask type node 560 is that of a child node of a node that uses a mask in identifying its child node, as current/next mask type node 560 uses a mask in determining if it was the correctly identified child node.

As shown, current/next mask type node 560 includes a node value field 561; a next node indication field 562, such as, but not limited to a base pointer, tree bitmap, mtree, or any other mechanism for identifying a next level node; a current node lookup path mask field 563; and a next portion lookup path mask field 564.

The processing of a current/next mask type node 560 as performed in one embodiment is shown in the corresponding flow diagram. Processing begins with process block 570. In process block 571, the last portion (i.e., stride) of the lookup path is masked with the current node lookup path mask 563 and compared to the corresponding last (stride) portion of the node value 561. In process block 572, the first portion of the lookup path (i.e., that prior to the last stride portion) is masked if according to any previously used masks and compared to the first portion of the node value 561.

As determined in process block 574, if both of these parts of the determination whether the node is a valid node results in a match, then a valid node has been retrieved. Then, as determined in process block 576, if a next node is to be retrieved (e.g., a valid or non-null next node indication and more strides remaining in the lookup path), then the next (e.g., child) node is identified and retrieved in process block 578 based on the next node indication 562 and the next portion (e.g., stride) of the lookup value masked with the next portion lookup path mask 564, such as, but not limited to adding the masked next portion to the base pointer. Otherwise, a valid node was not retrieved, and no match is indicated in process block 575. Processing is complete as indicated by process block 579.

Figure 6A:
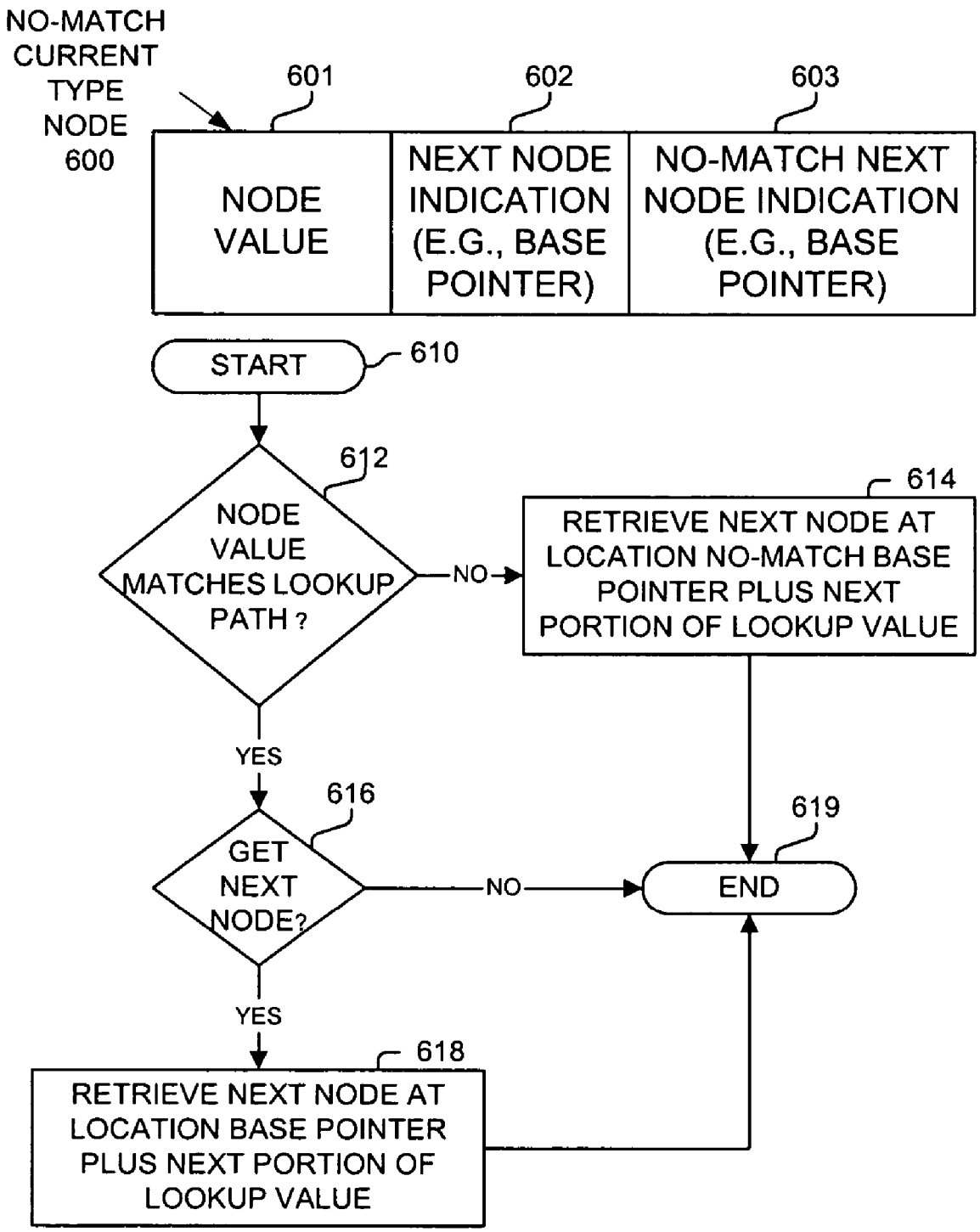

FIG. 6A illustrates a no-match current type node 600 used in one embodiment. As shown, simple node type node 600 includes a node value field 601, a next node indication field 602, such as, but not limited to a base pointer, tree bitmap, mtree, or any other mechanism for identifying a next level node, and a no-match next node indication field 603, such as, but not limited to a base pointer, tree bitmap, mtree, or any other mechanism for identifying a next level node.

The processing of a no-match current type node 600 as performed in one embodiment is shown in the corresponding flow diagram. Processing begins with process block 610. As determined in process block 612, if the node value matches the lookup path (e.g., equals; or if a mask was used in reaching a parent node, then equals the masked parent portion concatenated with the current stride portion of the lookup path), then a valid, matching node has been retrieved. Then, as determined in process block 616, if a next node is to be retrieved (e.g., a valid or non-null next node indication and more strides remaining in the lookup path), then the next (e.g., child) node is identified and retrieved in process block 618 based on the next node indication 602 and the next portion (e.g., stride) of the lookup value, such as, but not limited to adding the next portion to the base pointer. Otherwise, a valid, matching node was not retrieved, and in process block 614, then the next (e.g., child) node is identified and retrieved based on the no-match next node indication 603 and the next portion (e.g., stride) of the lookup value, such as, but not limited to adding the next portion to the base pointer. Processing is complete as indicated by process block 619.

Figure 6B:
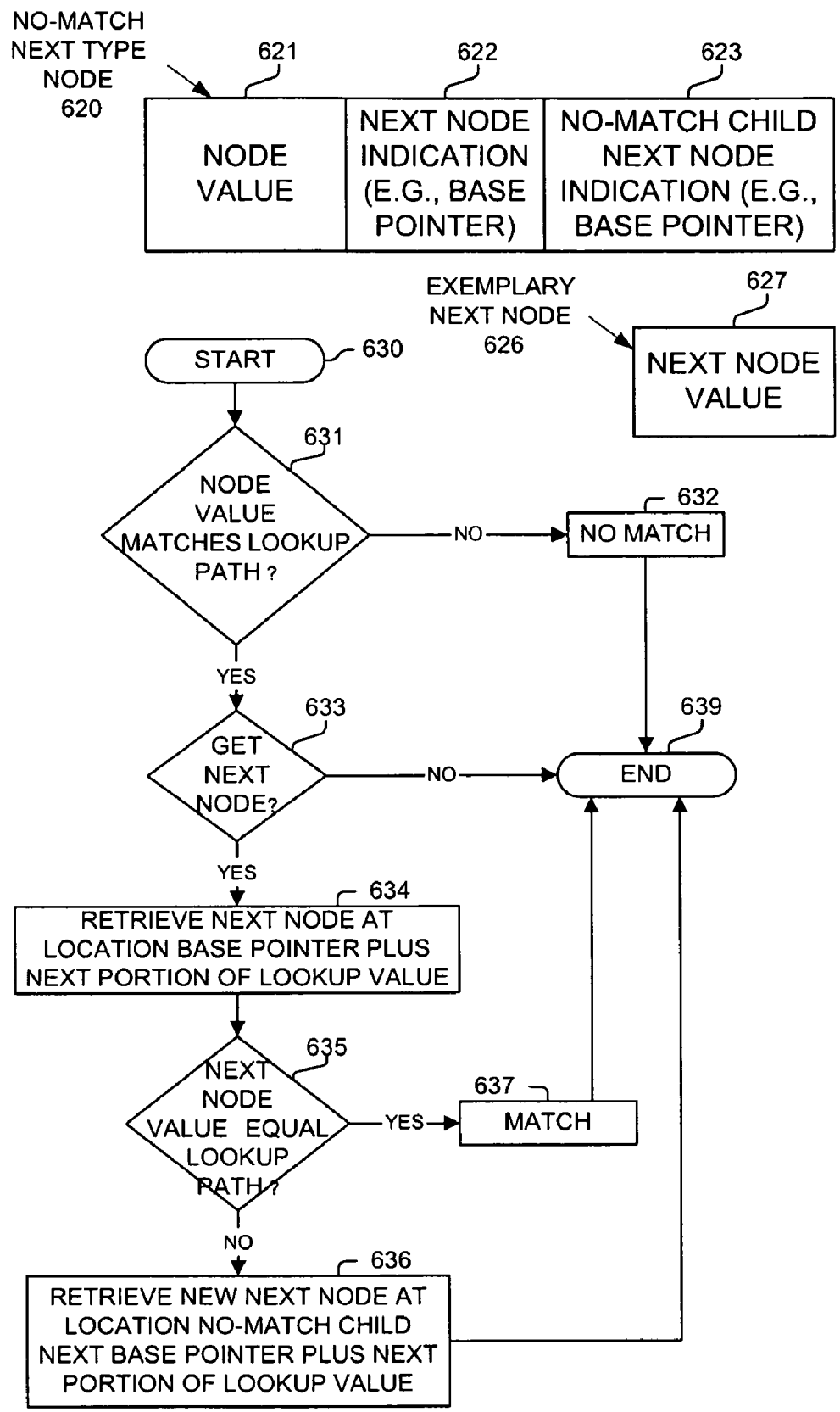

FIG. 6B illustrates a no-match next type node 620 used in one embodiment. As shown, no-match next type node 620 includes a node value field 621, a next node indication field 622, such as, but not limited to a base pointer, tree bitmap, mtree, or any other mechanism for identifying a next level node, and a no-match child next node indication field 623, such as, but not limited to a base pointer, tree bitmap, mtree, or any other mechanism for identifying a next level node. Also shown in FIG. 6B is a exemplary next node 616, including a next node value field 627.

The processing of a no-match next type node 620 as performed in one embodiment is shown in the corresponding flow diagram. Processing begins with process block 630. As determined in process block 631, if the node value matches the lookup path (e.g., equals; or if a mask was used in reaching a parent node, then equals the masked parent portion concatenated with the current stride portion of the lookup path), then a valid, matching node has been retrieved. Then, as determined in process block 633, if a next node is to be retrieved (e.g., a valid or non-null next node indication and more strides remaining in the lookup path), then the next (e.g., child) node is identified and retrieved in process block 634 based on the next node indication 622 and the next portion (e.g., stride) of the lookup value, such as, but not limited to adding the next portion to the base pointer. Otherwise, a valid, matching node was not retrieved, and in process block 632, a no-match is indicated.

At the next level, the child node (e.g., exemplary next node 626) is processed. As determined in process block 635, if the next node value 627 matches the lookup path (e.g., equals; or if a mask was used in reaching a parent node, then equals the masked parent portion concatenated with the current stride portion of the lookup path), then a valid, matching node has been retrieved and processing proceeds to process block 637 to perform further processing. Otherwise, in process block 636, the next node is identified and retrieved based on the no-match child next node indication field 623 (i.e., from the next node's parent node) and the next portion (e.g., stride) of the lookup value, such as, but not limited to adding the next portion to the base pointer.

Processing is complete as indicated by process block 639.

Figure 6C:
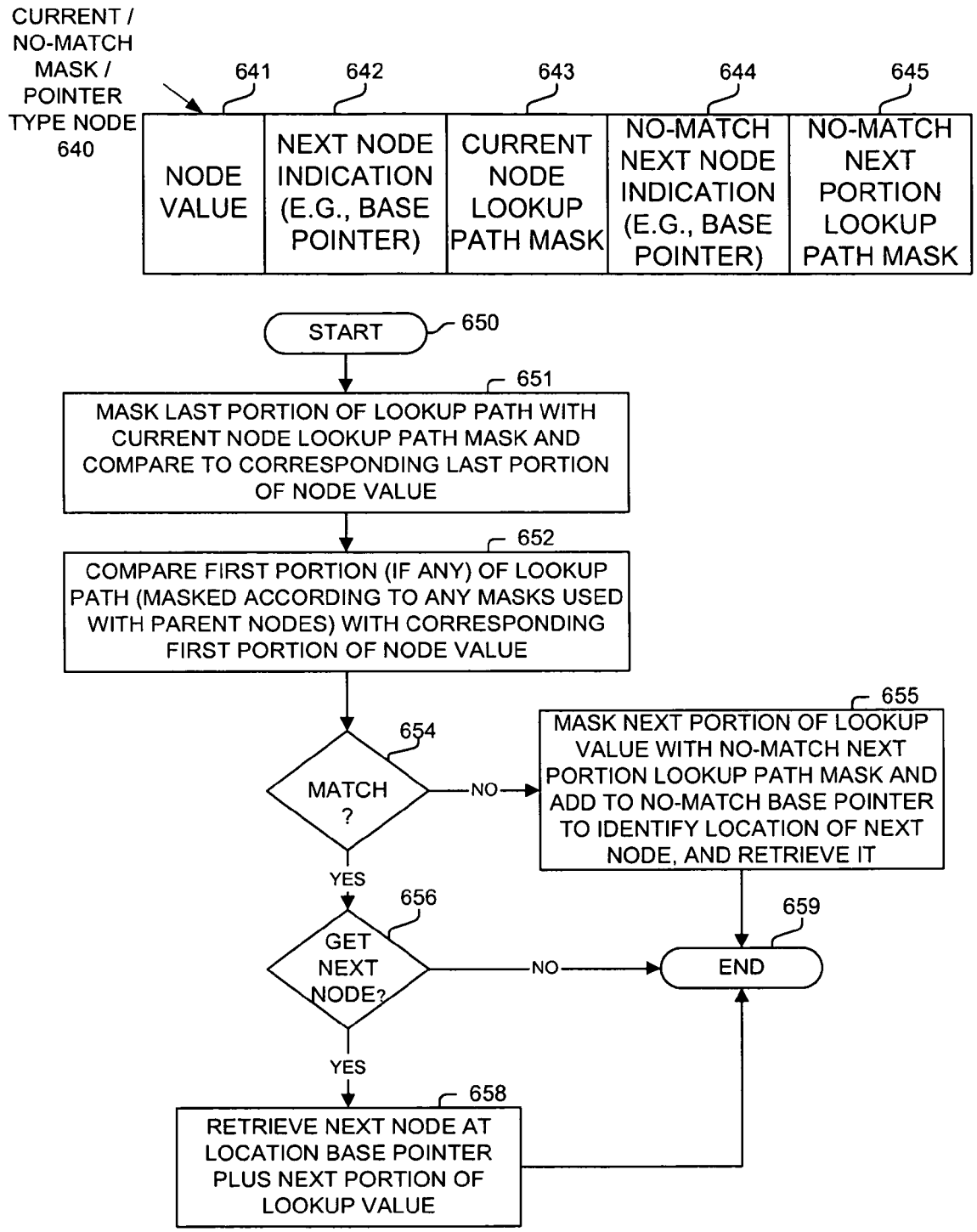

FIG. 6C illustrates a current/no-match mask/pointer type node 640 used in one embodiment. One use of the current/no-match mask/pointer type node 640 is that of a child node of a node that uses a mask in identifying its child node, as current/no-match mask/pointer type node 640 uses a mask in determining if it was the correctly identified child node.

As shown, current/no-match mask/pointer type node 640 includes a node value field 641; a next node indication field 642, such as, but not limited to a base pointer, tree bitmap, mtree, or any other mechanism for identifying a next level node; a current node lookup path mask field 643, a no-match next node indication field 644, such as, but not limited to a base pointer, tree bitmap, mtree, or any other mechanism for identifying a next level node; and a no-match next portion lookup path mask field 645.

The processing of a current/no-match mask/pointer type node 640 as performed in one embodiment is shown in the corresponding flow diagram. Processing begins with process block 650. In process block 651, the last portion (i.e., stride) of the lookup path is masked with the current node lookup path mask 643 and compared to the corresponding last (stride) portion of the node value 641. In process block 652, the first portion of the lookup path (i.e., that prior to the last stride portion) is masked if according to any previously used masks and compared to the first portion of the node value 641.

As determined in process block 654, if both of these parts of the determination whether the node is a valid node results in a match, then a valid child node has been retrieved. Then, as determined in process block 656, if a next node is to be retrieved (e.g., a valid or non-null next node indication and more strides remaining in the lookup path), then the next (e.g., child) node is identified and retrieved in process block 658 based on the next node indication 642 and the next portion (e.g., stride) of the lookup value, such as, but not limited to adding the next portion to the base pointer. Otherwise, a valid node was not retrieved, and the next (e.g., child) node is identified and retrieved in process block 655 based on the no-match next node indication 644 and the next portion (e.g., stride) of the lookup value masked with the no-match next portion lookup path mask 645, such as, but not limited to adding the masked next portion to the base pointer.

Processing is complete as indicated by process block 659.

Figure 6D:
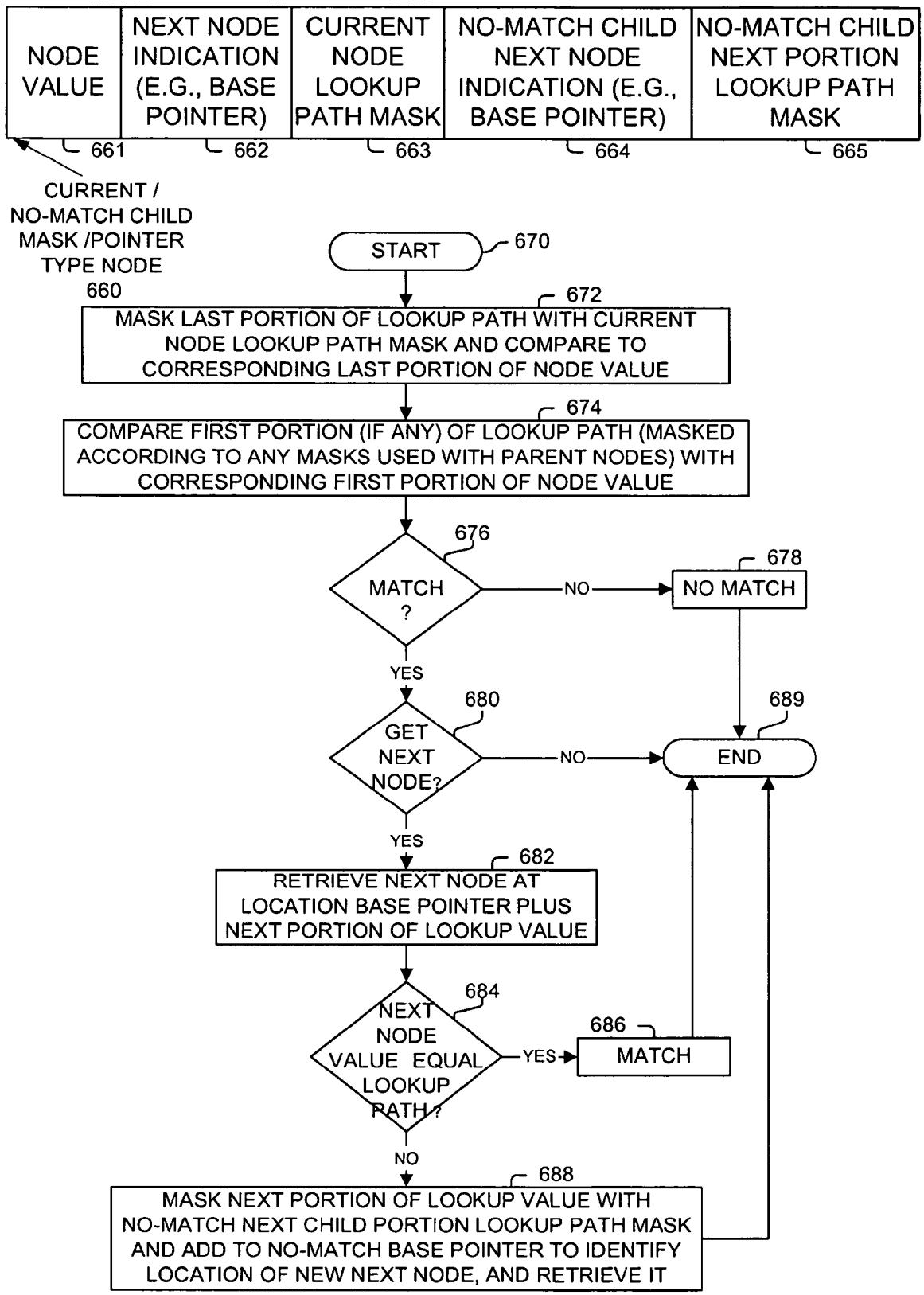

FIG. 6D illustrates a current/no-match child mask/pointer type node 660 used in one embodiment. One use of the current/no-match child mask/pointer type node 660 is that of a child node of a node that uses a mask in identifying its child node, as current/no-match child mask/pointer type node 660 uses a mask in determining if it was the correctly identified child node.

As shown, current/no-match child mask/pointer type node 660 includes a node value field 661; a next node indication field 662, such as, but not limited to a base pointer, tree bitmap, mtree, or any other mechanism for identifying a next level node; a current node lookup path mask field 663, a no-match child next node indication field 664, such as, but not limited to a base pointer, tree bitmap, mtree, or any other mechanism for identifying a next level node; and a no-match child next portion lookup path mask 665.

The processing of a current/no-match child mask/pointer type node 660 as performed in one embodiment is shown in the corresponding flow diagram. Processing begins with process block 670. In process block 672, the last portion (i.e., stride) of the lookup path is masked with the current node lookup path mask 663 and compared to the corresponding last (stride) portion of the node value 661. In process block 674, the first portion of the lookup path (i.e., that prior to the last stride portion) is masked if according to any previously used masks and compared to the first portion of the node value 661.

As determined in process block 676, if both of these parts of the determination whether the node is a valid node results in a match, then a valid child node has been retrieved. Then, as determined in process block 680, if a next node is to be retrieved (e.g., a valid or non-null next node indication and more strides remaining in the lookup path), then the next (e.g., child) node is identified and retrieved in process block 682 based on the next node indication 662 and the next portion (e.g., stride) of the lookup value, such as, but not limited to adding the next portion to the base pointer. Otherwise, a valid, matching node was not retrieved, and in process block 678, a no-match is indicated.

At the next level, the child node (e.g., exemplary next node 626 of FIG. 6B) is processed. As determined in process block 684, if the next node value 627 (FIG. 6B) matches the lookup path (e.g., equals; or if a mask was used in reaching a parent node, then equals the masked parent portion concatenated with the current stride portion of the lookup path), then a valid, matching node has been retrieved and processing proceeds to process block 686 to perform further processing. Otherwise, in process block 688, the next (e.g., child) node is identified and retrieved based on the no-match child next node indication 664 and the next portion (e.g., stride) of the lookup value masked with the no-match child next portion lookup path mask 665, such as, but not limited to adding the masked next portion to the base pointer.

Processing is complete as indicated by process block 689.

Figure 7A:
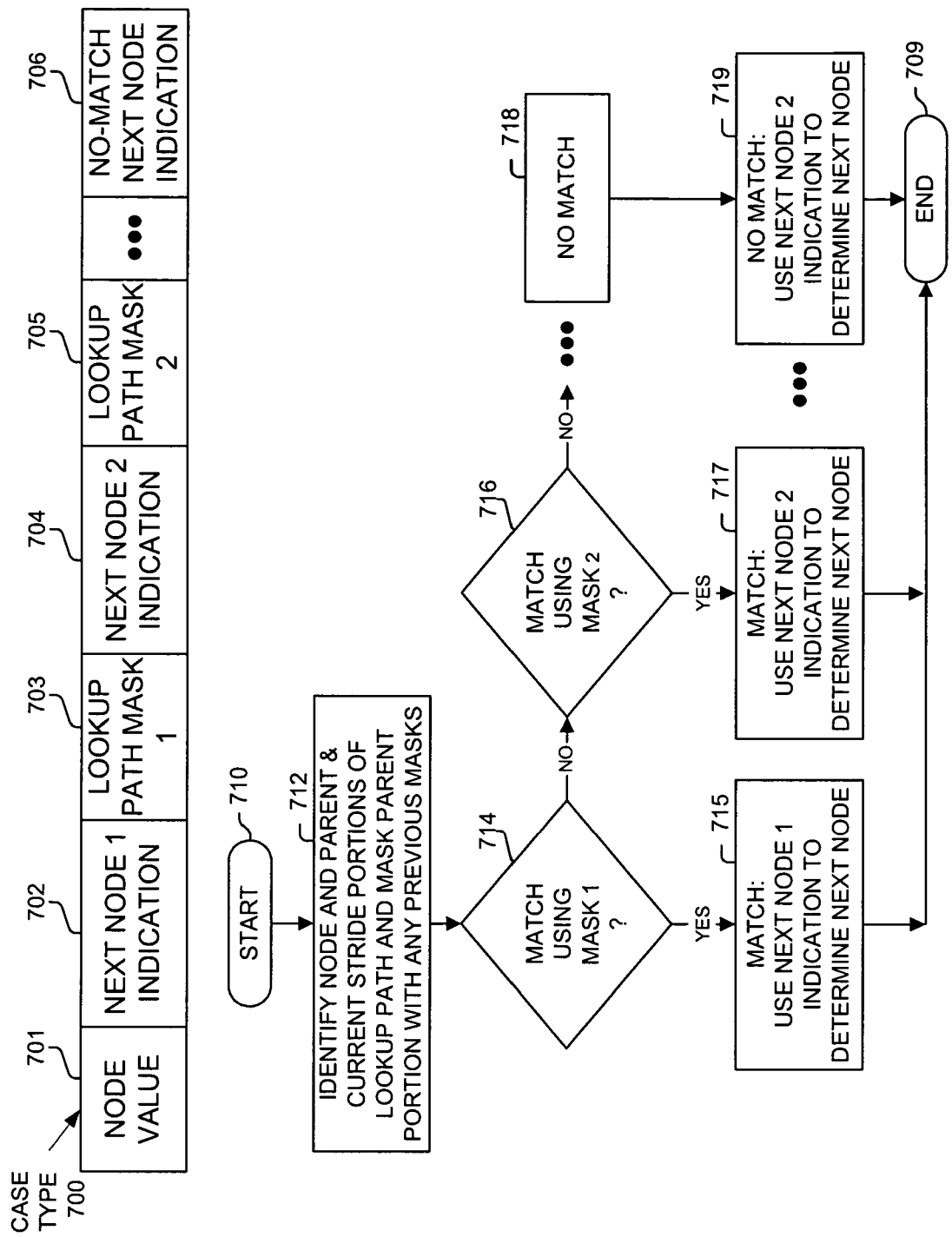

FIG. 7A illustrates a case type node 700 used in one embodiment. As shown, case type node 700 includes a node value field 701, a series of pairs of next node indication fields (702, 704) and lookup path mask fields (703, 705) and a no-match next node indication field 706.

The processing of a case type node 700 as performed in one embodiment is shown in the corresponding flow diagram. Processing begins with process block 710. In process block 712, the node, parent and current stride portions of the lookup path are identified, and the parent portion is masked with any previous masks (if any).

Then, in process blocks 714, 716 and so on, each of the case conditions are evaluated (e.g. the stride portion is masked with the corresponding lookup path mask and compared to the node value 701), and when a match is identified, then the corresponding next node indication (715, 717) is used to identify and retrieve the child node. Note, for simplicity of illustration, only two case conditions are used. One embodiment supports one to an unlimited (e.g., large) number of case conditions. Optionally, the case type node 700 can include a condition to follow if no match is identified (i.e., as indicated by process block 718), with the next node determined in process block 719 using no-match next node indication 706. Processing is complete as indicated by process block 709.

Figure 7B:
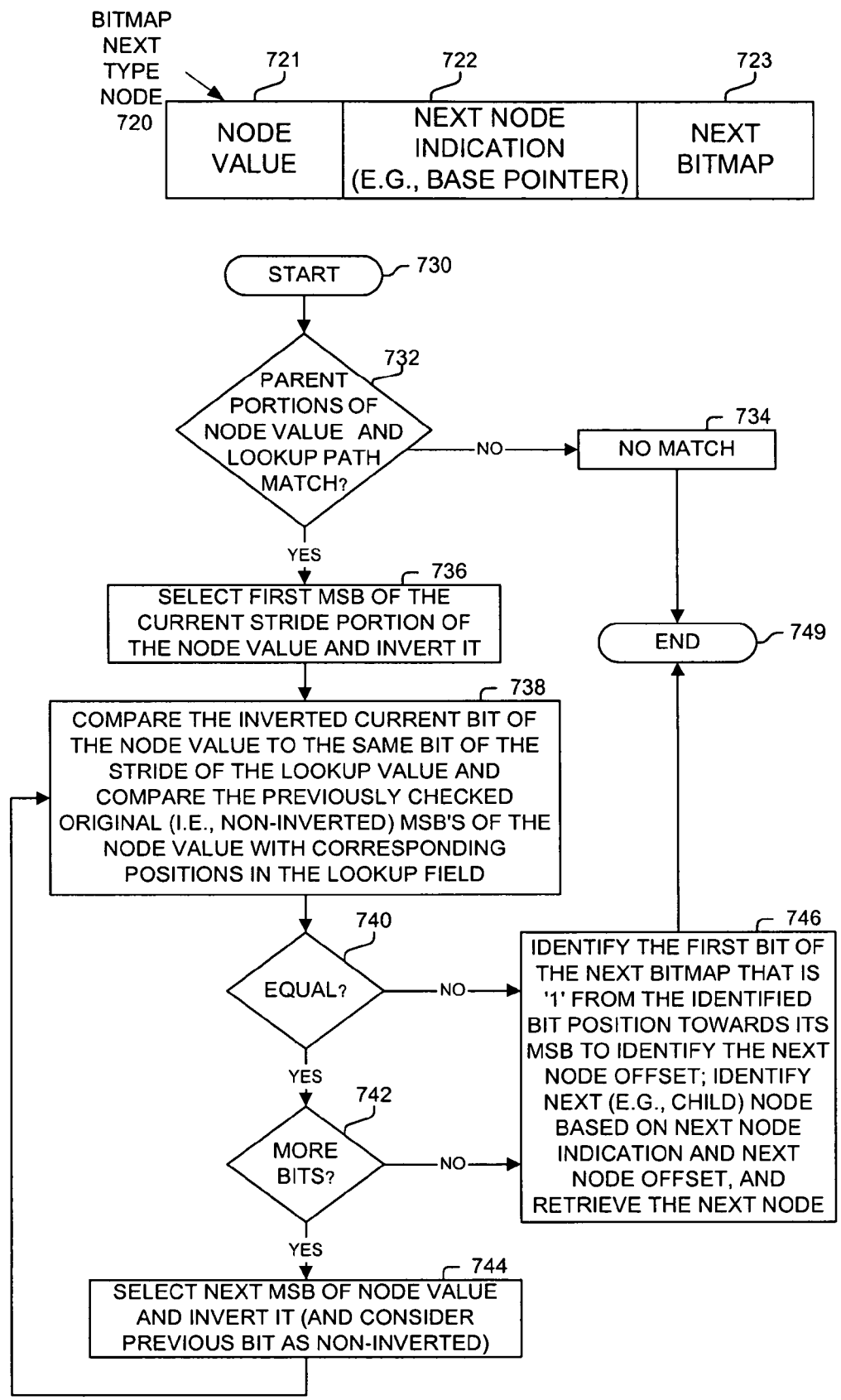

FIG. 7B illustrates a bitmap next type node 720 used in one embodiment. As shown, bitmap next type node 720 includes a node value field 721; a next node indication field 702, such as, but not limited to a base pointer, tree bitmap, mtree, or any other mechanism for identifying a next level node; and a next bitmap field 723.

The processing of a bitmap next type node 720 as performed in one embodiment is shown in the corresponding flow diagram. Processing begins with process block 730. As determined in process block 732, if the parent portions of the node value and lookup paths do not match, then no match processing is performed in process block 734. Otherwise, in process block 736, the current stride portion of the node value 721 is processed, starting with the first most significant bit (MSB) and inverting it. In process block 738, the inverted current bit is compared with the same bit of the stride of the lookup value, and any previously checked MSBs (non-inverted) are compared with the corresponding bits of the lookup value. As determined in process block 740, if these are all equal, then processing continues if there are more bits in the current stride portion of the node value 721 as determined in process block 742. In process block 744, then next MSB of the node value is inverted and processing returns to process block 738.

Otherwise, processing proceeds to process block 746, wherein the offset to use in identifying the child node is determined by finding the first set bit in next bitmap 723 from the current bit position towards the MSB. This bit position corresponds to the offset value which is used in conjunction with next node indication 722 to identify the next (e.g., child) node, and it is retrieved and processed.

Processing is complete as indicated by process block 749.

Figure 7C:
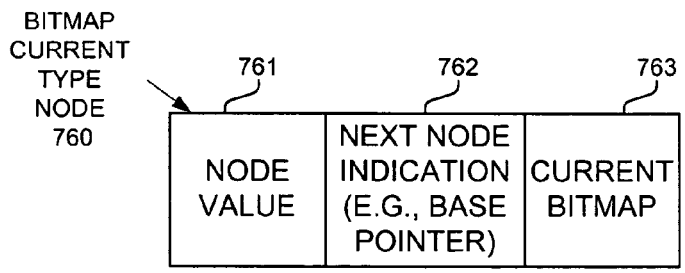
Figure 7C:
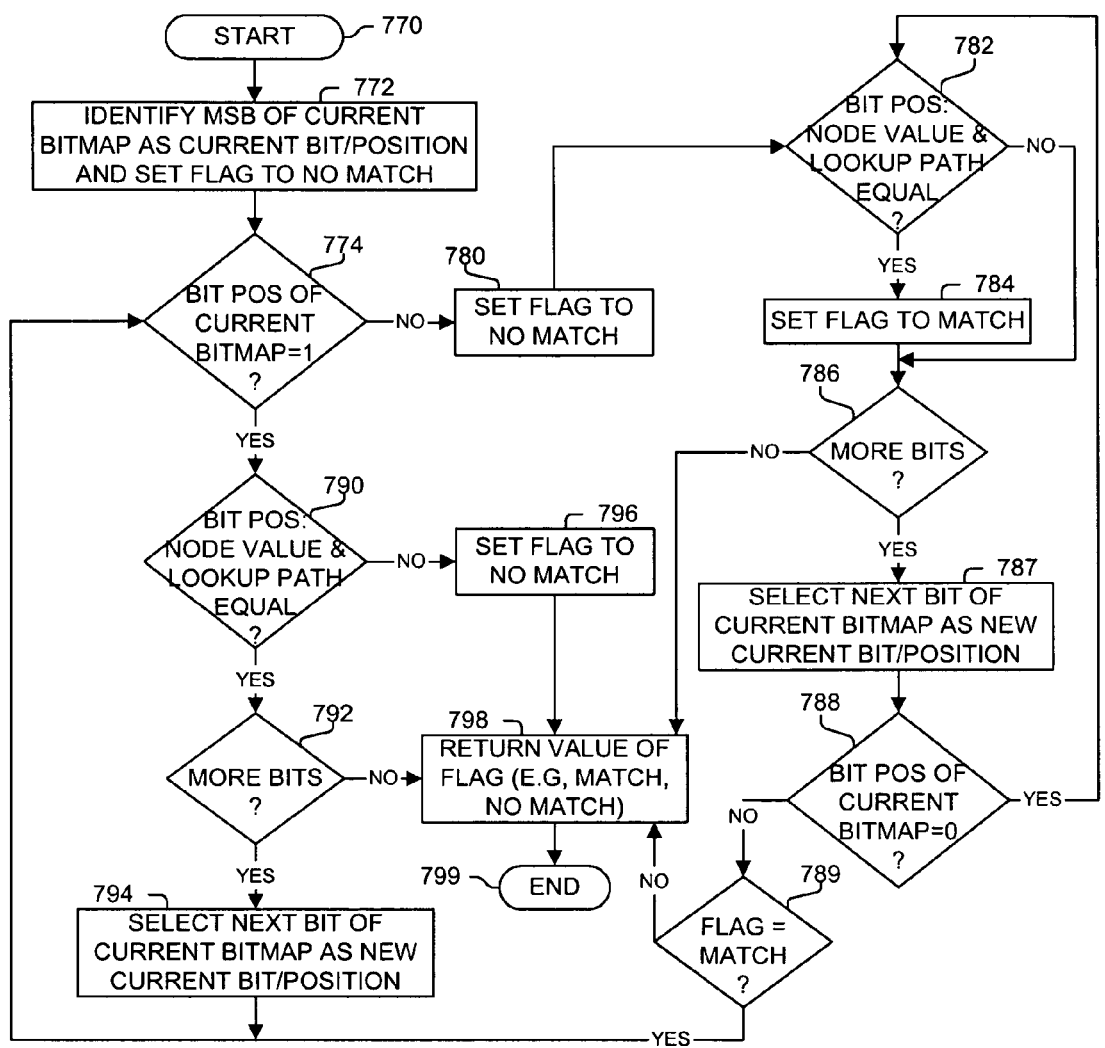

FIG. 7C illustrates a bitmap current type node 760 used in one embodiment. One use of the bitmap current type node 760 is that of a child node of a node that uses a bitmap to determine an offset, such as bitmap next type node 720 (FIG. 7B), as bitmap current type node 760 uses a bitmap in determining if it was the correctly identified child node. In one embodiment, each contiguous series of one or more zeros in the bitmap field identifies a group of bit positions that corresponding bits of the node and lookup values must match in at least at one of these bit positions, but not necessarily all of these bit positions within that series of one or more zeros.

As shown, bitmap current type node 760 includes a node value field 761; a next node indication field 762, such as, but not limited to a base pointer, tree bitmap, mtree, or any other mechanism for identifying a next level node; and a current bitmap field 763.

The processing of a current mask type node 760 to determine if it is a proper child node as performed in one embodiment is shown in the corresponding flow diagram. Processing begins with process block 770. In process block 772, the MSB of current bitmap 763 is identified as the current bit/position and a flag is set to no match. As determined in process block 774, if the bit of the current bitmap is not set, then processing proceeds to process block 780.

Process blocks 780-789 determine if there is at least one matching set of node and lookup value bits within the contiguous series of bits of value zero. If so, then the flag is set to match if a one is encountered in the bitmap, and processing returns to process block 774 to check any bits remaining after this contiguous series of bits of value zero Otherwise, no match was found in the contiguous series of one or more zero bits, and a no match indication is returned as processing proceeds to process block 798.

Note, one embodiment reverses the significance of the values of zeros and ones in current bitmap 763, and performs this checking for contiguous bits of value one. Also, one embodiment signals a match as soon as it finds a matching value in the series of contiguous bits without checking any of the remaining bits (e.g., goes from process block 784 to 798). Also, a flag variable is typically not used in this optimization as it is known immediately whether there is a match or not. This optimization is especially useful if there is at most one series of contiguous bits of significance (e.g., of value zero) in current bitmap 763.

In process block 780, the flag is set to no match as there must be a match in each series of zero bits. As determined in process block 782, if the node and lookup path values are equal at the current bit position, then in process block 784, the flag is set to match. As determined in process block 786, if there are more bits to check, then in process block 787, a next bit of current bitmap 763 is selected as the new current bit/position. If this bit is part of the series of zeros as determined in process block 788, then processing returns to process block 782. Otherwise, if there was not a match in the series as determined in process block 789, then processing proceeds to process block 798 to return a no match indication; otherwise processing returns to process block 774.

Otherwise, as determined in process block 774, the bit was determined to be set, and thus, the corresponding bit positions of the node and lookup values must be equal for a match to be possible, else there is no match. Process block 790 checks if they are equal, and if not, in process block 796, the flag is set to no match, and in process block 798, the no match indication is returned. Otherwise, if there are more bits to check as determined in process block 792, then in process block 794, a next bit of current bitmap 763 is selected as the new current bit/position, and processing returns to process block 774. Otherwise, process block 792 determined that there are no more bits to check, and an indication of the value of the flag (i.e., either match or no match) is returned in process block 798. Processing is complete as indicated by process block 799.

Figure 8A:
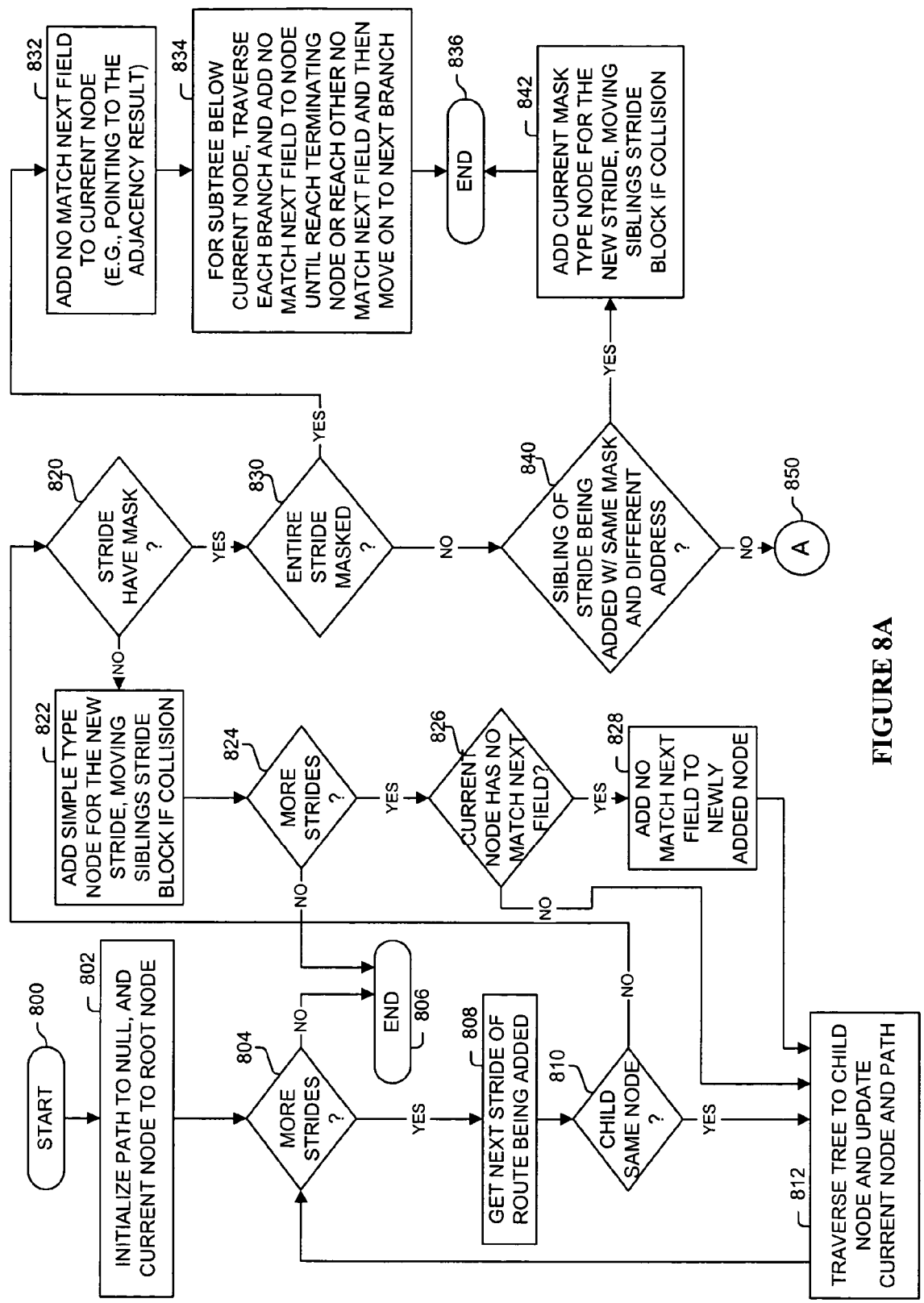
FIGS. 8A-B are flow diagrams illustrating a process used in one embodiment for programming a tree data structure with routes.
Figure 8B:
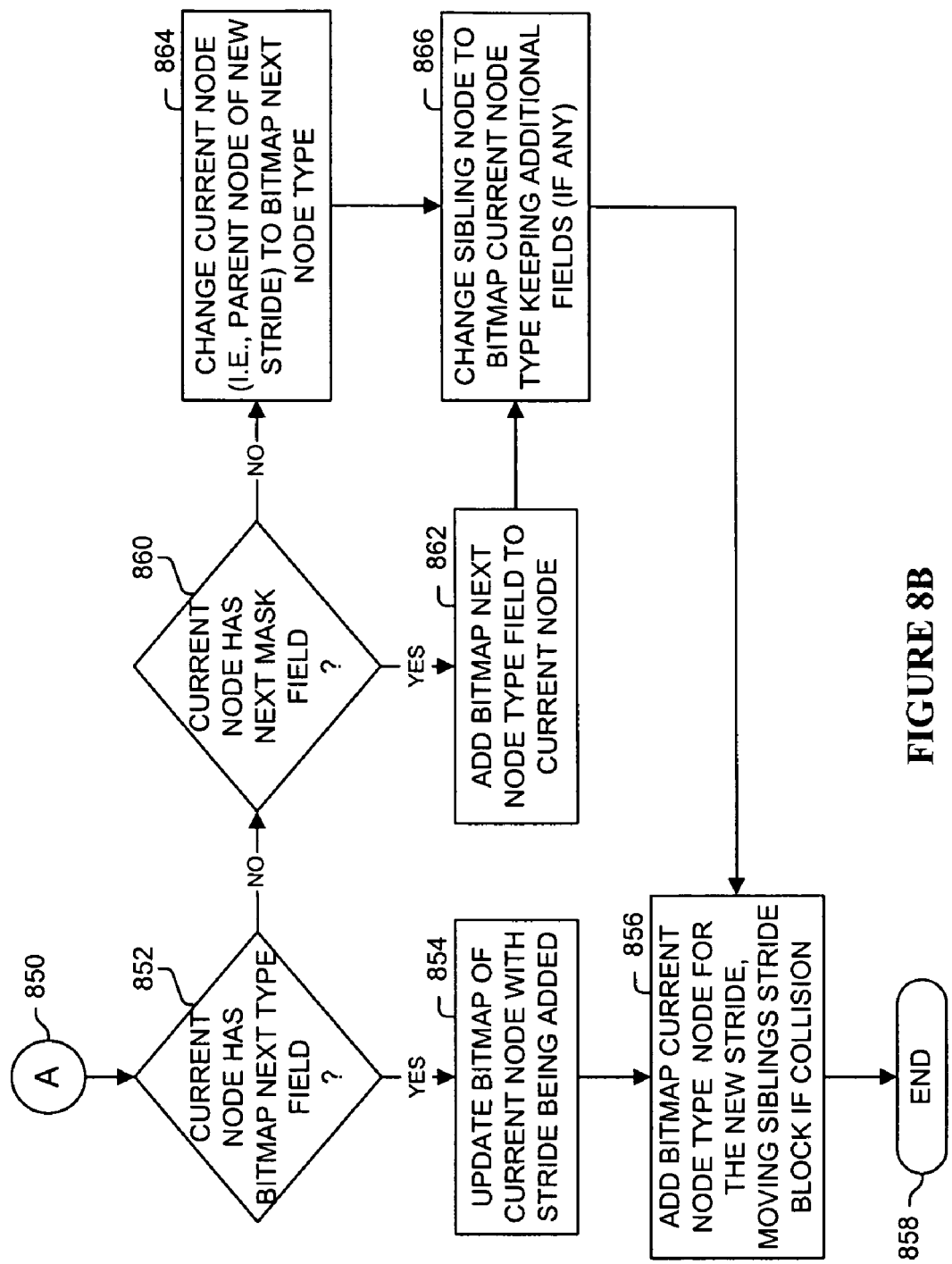

FIGS. 8A-B are flow diagrams illustrating a process used in one embodiment for programming a tree data structure with routes, and more specifically, for adding a route to a subtree. Note, the number of different ways to program a tree data structure is unlimited. Illustrated herein is just a subset of an extensible number of ways to program the tree data structure. Also, it is possible that a different programming methods generates the same tree data structure or a different data structure depending on the routes being added and which node types are used in programming the tree data structure. With the powerful, extensive, and extensible types of nodes available to add to a tree data structure, it may be possible to program a set of routes using different node types.

Processing begins with process block 800, and proceeds to process block 802, wherein a variable for storing the path traversed through the subtree to reach the current node is initialized to null, and a variable for storing a pointer or other indication of the current node within the tree is set to the root node of the subtree.

As determined in process block 804, while there are more strides to be processed of the route being added, processing proceeds to process block 808; otherwise, processing is complete as indicated by process block 806. In process block 808, the next stride of the route being added is identified. As determined in process block 810, if the child node of the current node is the same route of that being added (e.g., the node value of the child node matches the path variable and the next stride value), then a matching node already exists, and thus, one does not need to be added for this stride. In process block 812, the subtree is traversed to this child node (i.e., the current node and path variables are updated accordingly); and processing returns to process block 804.

Otherwise, as determined in process block 820, if the stride does not have a mask, then in process block 822, a simple type node is added for this stride as the other possible fields are not required; however, future processing may change this node type or add additional fields. If there is a collision with another node (e.g., the memory location for adding the node for this stride is already occupied by another node), then a new base pointer is determined for the current node (i.e., the parent node of the node being added). The new node is added at a memory location determined by the base pointer of the parent node and an offset corresponding to the stride being added. If there was a collision, the siblings of the new child node (e.g., all other children of the current/parent node) also need to be moved to memory locations relative to the new base pointer.

Figure 8C:
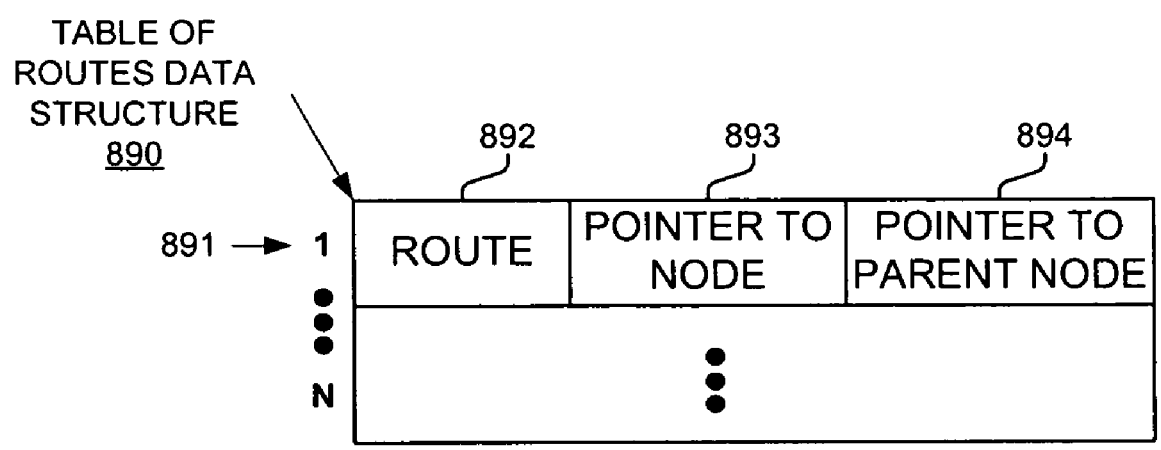
FIG. 8C is a block diagram of a data structure used in one embodiment for readily identifying routes represented in a tree data structure.

Note, the siblings of the child (e.g., the children of the current node) can be identified in numerous ways. One embodiment traverses the tree to discover which nodes are present. One embodiment uses another data structure to identify the sibling nodes, such as the data structure illustrated in FIG. 8C, which is just one of an unlimited possible number of data structures that can be used to identify siblings and other nodes present in the data structure (and typically in the tree). Shown is a table of routes data structure 890, which is used to store the set of routes entered in the tree data structure. In one embodiment entry 891, includes a route value 892, a pointer 893 to the node representing the route, and a pointer 894 to the parent of the node representing the route. One embodiment stores these routes in sorted order for readily identifying the nodes. One embodiment uses an associative memory in storing and/or searching data structure 890. One embodiment uses a hash function or other data structure for faster access to routes. As shown, data structure 890 includes an entry 891 for each route included in the tree data structure.

Returning to the processing of FIG. 8A, as determined in process block 824, if there are no more strides to be added, then the route has been added and processing is complete as indicated by process block 806. Otherwise, as determined in process block 826, if the current node includes a no match next field, then in process block 828, a no match next field is added to the newly added child node to provide for subsequent identification of an already identified matching field when a longer matching route is not found. When identifying a matching route, normally a longest prefix matching operation is performed as multiple entries can match a lookup value. For example, the routes 10.*.*.*, 10.1.*.*, and 10.1.2.4 can be part of the tree data structure. Process blocks 826-828 are used to add no match next fields so that if a match is not found when performing a lookup at a subsequent current stride level in search of a matching prefix longer than an already encountered prefix matching the lookup value. A no match field is one way to identify the correct matching prefix. Processing returns to process block 812.

Otherwise, the stride was identified in process block 820 to have a mask. Then, as determined in process block 830, if the entire stride is masked, then in process block 832, a no match next field is added to the current node. This no match next field typically points to an adjacency result as the lookup operation will be complete when this no match next field is referenced. It could also point to some other node. Next, in process block 834, for each subtree below the current node, each branch is traversed to add no match next fields to the nodes of the branch until a terminating node (e.g., one with no children) is reached or another no match next field is encountered (e.g., a longer prefix). Processing is complete as indicated by process block 836.

Otherwise, as determined in process block 840, if there is a sibling of the current stride being added with the same mask and different address, then in process block 842, a current mask type node is added for the new stride as the current node (i.e., the parent of the node being added for the current stride) uses a mask in identifying the location(s) of its children node(s). If there is a collision with another node (e.g., the memory location for adding the node for this stride is already occupied by another node), then a new base pointer is determined for the current node (i.e., the parent node of the node being added). The new node is added at a memory location determined by the base pointer of the parent node and an offset corresponding to the stride being added. If there was a collision, the siblings of the new child node (e.g., all other children of the current/parent node) also need to be moved to memory locations relative to the new base pointer. Processing is complete as indicated by process block 836.

Otherwise, processing proceeds to process block 852 in FIG. 8B, as illustrated by connector A 850. As determined in process block 852, if the current node has a bitmap next type field, then in process block 854, the bitmap of the current node is updated with the stride being added. Otherwise, as determined in process block 860, if the current node has a next mask field, then in process block 862, the bitmap next node typed field is added to the current node and populated according to the route being added; else in process block 864, the current node (i.e., the parent of the node being added) is changed to a bitmap next node type. In process block 866, the sibling node is changed to bitmap current node type and any additional fields are kept with the new node. In process block 856, a bitmap current node type node is added for the new stride. If there is a collision with another node (e.g., the memory location for adding the node for this stride is already occupied by another node), then a new base pointer is determined for the current node (i.e., the parent node of the node being added). The new node is added at a memory location determined by the base pointer of the parent node and an offset corresponding to the stride being added. If there was a collision, the siblings of the new child node (e.g., all other children of the current/parent node) also need to be moved to memory locations relative to the new base pointer. Processing is complete as indicated by process block 858.

Figure 9A:
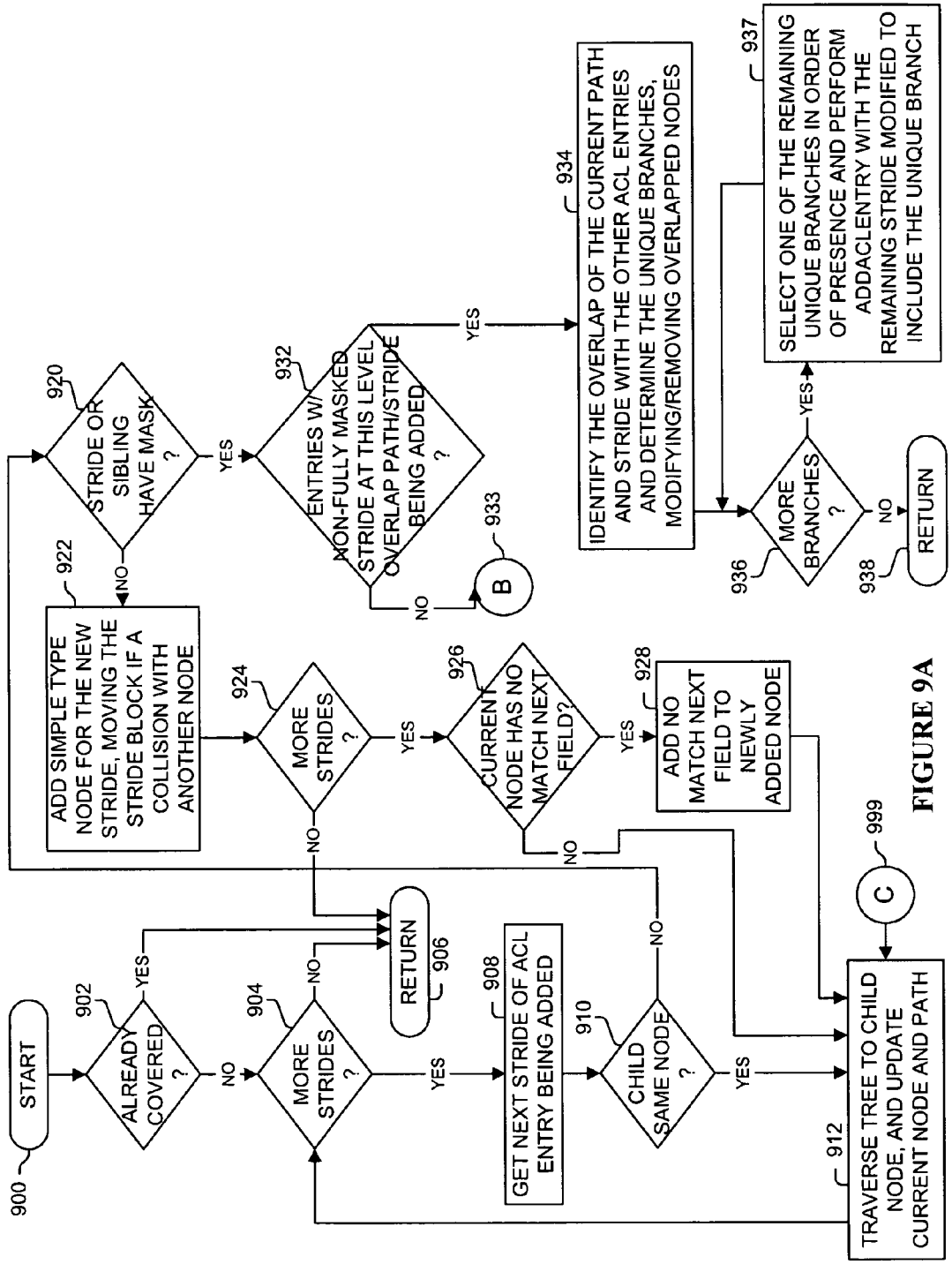
FIGS. 9A-C are flow diagrams illustrating a process used in one embodiment for programming a tree data structure with access control list entries.
Figure 9B:
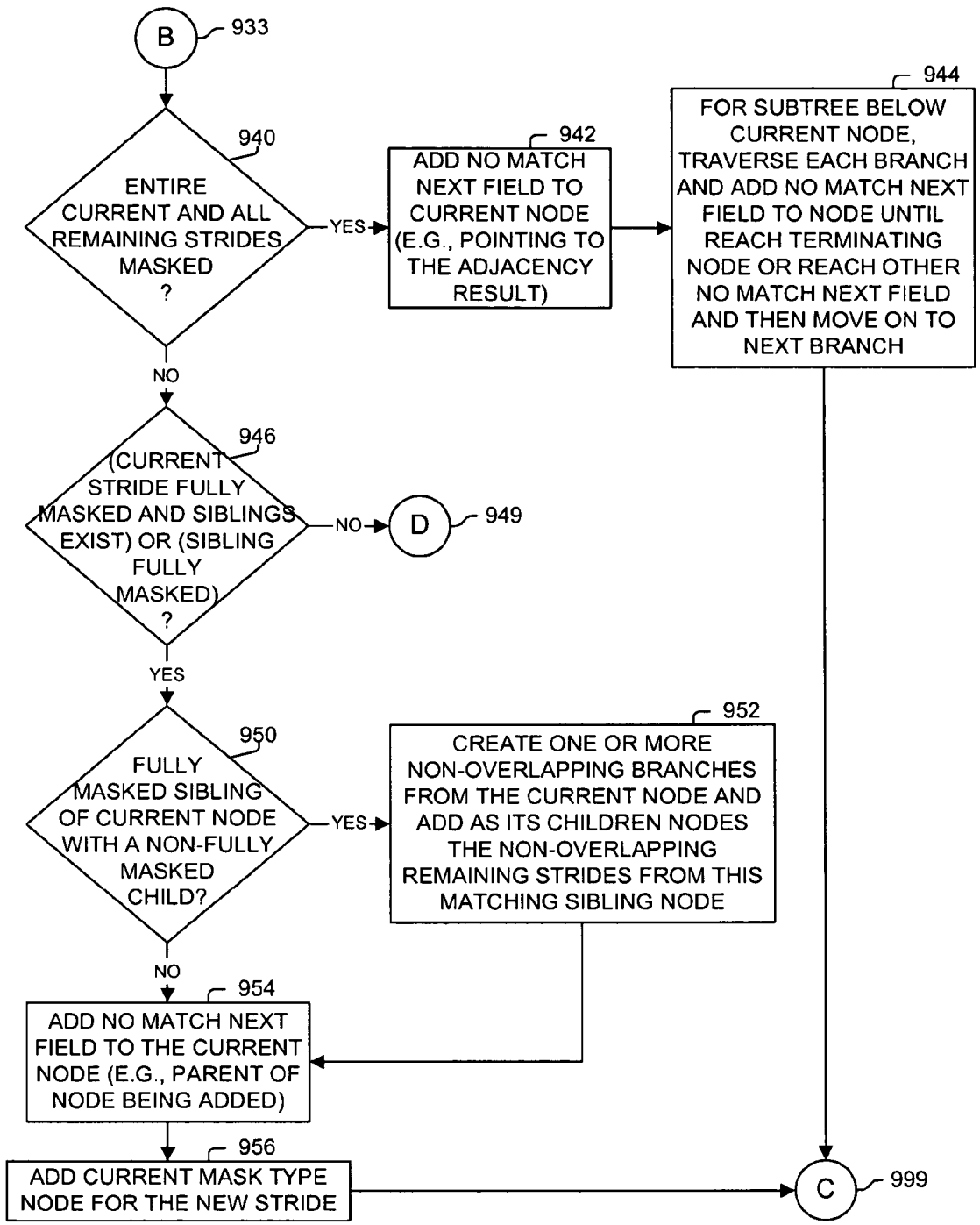
Figure 9C:
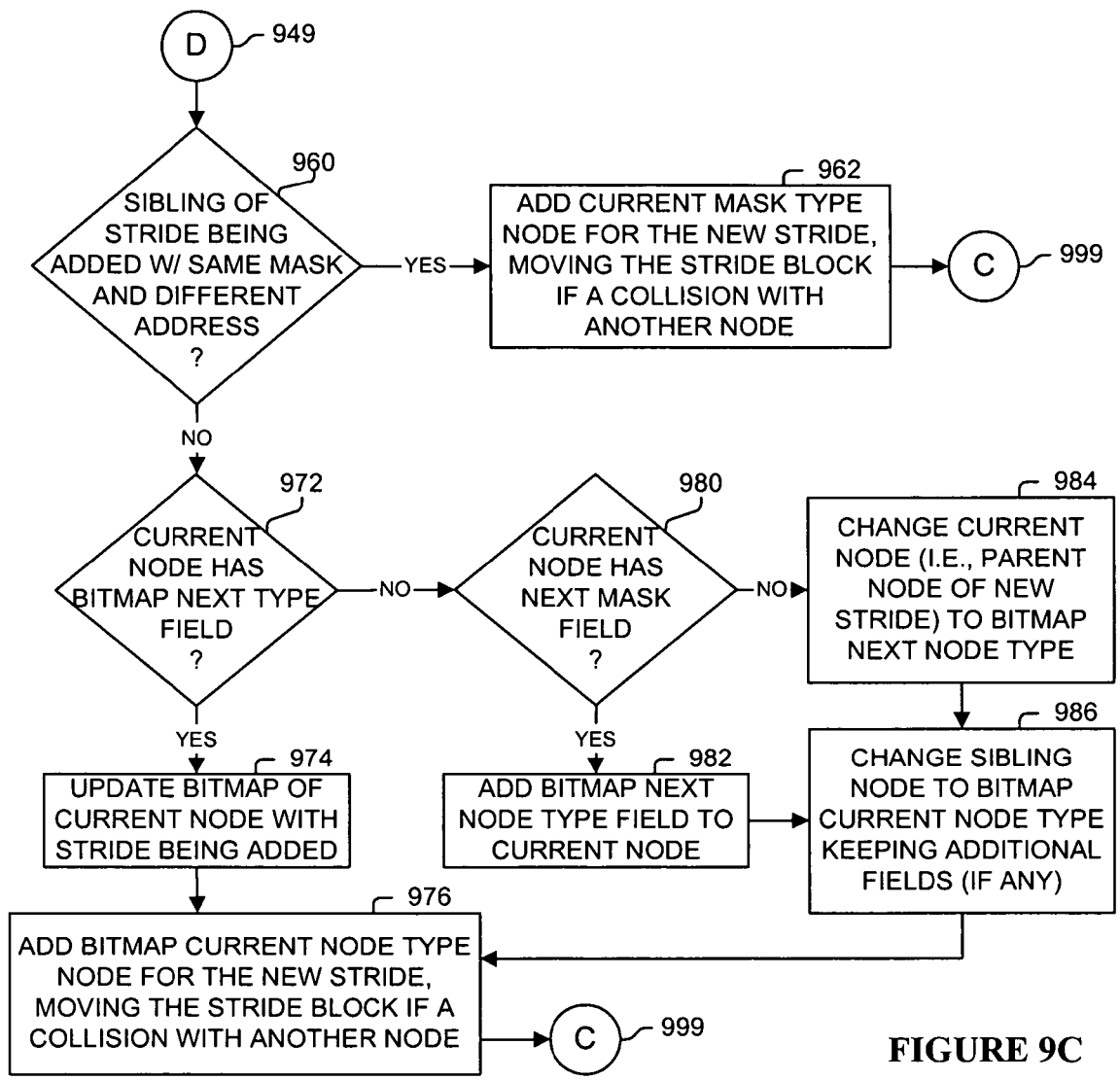

FIGS. 9A-C are flow diagrams illustrating a process "ADDACLENTRY" used in one embodiment for programming a tree data structure with access control list entries, and more specifically, for adding an access control list entry to a subtree. Note, the process illustrated in FIGS. 9A-C is recursive in nature. Of course, other embodiments may or may not use recursive processes to add ACL entries to a tree in accordance with an embodiment. Also, the number of different ways to program a tree data structure is unlimited. Illustrated herein is just a subset of an extensible number of ways to program the tree data structure. Also, it is possible that a different programming methods generates the same tree data structure or a different data structure depending on the ACL entries being added and which node types are used by in programming the tree data structure. With the powerful, extensive, and extensible types of nodes available to add to a tree data structure, it may be possible to program a set of ACL entries using different node types.

To initiate the processing, ADDACLENTRY is called with three arguments in one embodiment: path (the current path already traversed for this node), current node (a pointer or other indication of the current position in the subtree), and remaining strides (the remaining strides to be added, if any).

Initially, ADDACLENTRY is called with the arguments of path being null, the current node being the root of the subtree to which the ACL entry is being added, and all the strides of the ACL entry being added, and processing begins with process block 900.

As determined in process block 902, if the entry being added (i.e., that identified by the remaining stride value) is already covered by another entry, then processing is complete. Typically, the entry in question is not added for ACLs because the first matching entry in the ordered ACL is to be identified. In contrast, a longest prefix matching operation is typically performed to identify the longest matching route. Of course, one embodiment adds these routes even though they should never be matched, and one embodiment adds ACL entries in a different order and includes an indication of the matching order.

Figure 9D:
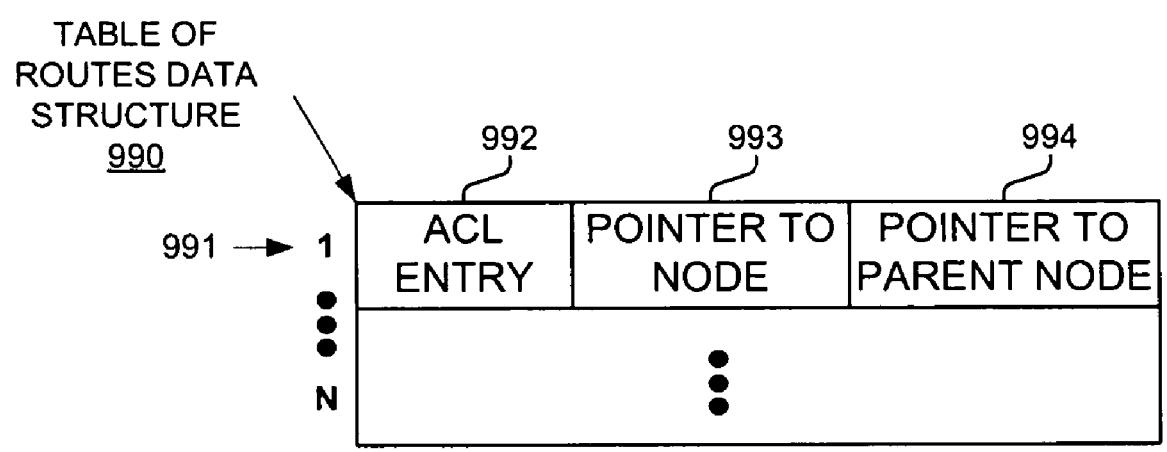
FIG. 9D is a block diagram of a data structure used in one embodiment for readily identifying access control list entries represented in a tree data structure.

Note, whether an entry is covered as well as the siblings of a node can be identified in numerous ways. One embodiment traverses the tree to discover which nodes are present. One embodiment uses another data structure to identify the covering and/or sibling nodes, such as the data structure illustrated in FIG. 9D, which is just one of an unlimited possible number of data structures that can be used to identify siblings and other nodes present in the data structure (and typically in the tree). Shown is a table of ACL entries data structure 990, which is used to store the set of ACL entries entered in the tree data structure. In one embodiment entry 991, includes a ACL entry value 992, a pointer 993 to the node representing the ACL entry, and a pointer 994 to the parent of the node representing the ACL entry. One embodiment stores these ACL entries in sorted order for readily identifying the nodes. One embodiment uses an associative memory in storing and/or searching data structure 990, as a very easy way to identify if a route is covered is to perform a search on a ternary content addressable memory (TCAM) populated with the each ACL entries already added to the subtrie with the lookup word corresponding to the node being added (i.e., the remaining strides value). If a hit is made, then the entry is covered, and a miss indicates the entry is not covered by another node. One embodiment uses a hash function or other data structure for faster access to ACL entries. As shown, data structure 990 includes an entry 991 for each ACL entry included in the tree data structure.

Returning to the processing of FIG. 9A, as determined in process block 904, while there are more strides to be processed of the ACL entry being added, processing proceeds to process block 908; otherwise, processing is complete as indicated by process block 906. In process block 908, the next stride of the ACL entry being added is identified. As determined in process block 910, if the child node of the current node is the same ACL entry of that being added (e.g., the node value of the child node matches the path variable and the next stride value including masks), then a matching node already exists, and thus, one does not need to be added for this stride. In process block 912, the subtree is traversed to this child node (i.e., the current node and path variables are updated accordingly); and processing returns to process block 904.

Otherwise, as determined in process block 920, if the stride or a sibling of the stride has a mask, then processing proceeds to process block 930 (described hereinafter); otherwise in process block 922, a simple type node is added for this stride as the other possible fields are not required; however, future processing may change this node type or add additional fields. If there is a collision with another node (e.g., the memory location for adding the node for this stride is already occupied by another node), then a new base pointer is determined for the current node (i.e., the parent node of the node being added). The new node is added at a memory location determined by the base pointer of the parent node and an offset corresponding to the stride being added, and all siblings of the new child node (e.g., all other children of the current/parent node) are moved to memory locations relative to the new base pointer. As previously discussed, the siblings of the child (e.g., the children of the current node) can be identified in numerous ways including, but not limited to traversing the subtree or using another data structure (e.g., that illustrated in FIG. 9D or another data structure).

As determined in process block 924, if there are no more strides to be added, then the ACL entry has been added and processing is complete as indicated by process block 906. Otherwise, as determined in process block 926, if the current node includes a no match next field, then in process block 928, a no match next field is added to the newly added child node to provide for subsequent identification of an already identified matching field. Processing returns to process block 912.

Otherwise, the stride and/or a sibling was identified in process block 920 to have a mask. As determined in process block 932, if there are no entries with a non-fully masked stride at this level that overlap the path/stride being added, then processing proceeds to the flow diagram illustrated in FIG. 9B, as indicated by connector B 933.

Turning to the processing of FIG. 9B, processing proceeds from connector B 933. As determined in process block 940, if the entire current stride and all remaining strides are being masked, then in process block 942 a no match next field is added to the current node. This no match next field typically points to an ACL action/pointer result as the lookup operation will be complete when this no match next field is referenced. It could also point to some other node. Next, in process block 944, for each subtree below the current node, each branch is traversed to add a no match next field to each of the nodes of the branch until a terminating node (e.g., one with no children) is reached or another no match next field is encountered. Processing returns to process block 912 of FIG. 9A as indicated by connector C 999.

Otherwise, as determined in process block 946, if the current stride is fully masked and siblings of the node being added exist, or a sibling is fully masked, then processing proceeds to process block 950, else processing proceeds to the flow diagram illustrated in FIG. 9C, as indicated by connector D 949.

As determined in process block 950, if one or more branches need to be created, then in process block 952, these branches in the tree are created. In one embodiment, one or more branches are created if there is a fully masked matching sibling of the current node (i.e., corresponding to the parent of the stride being added) and a non-fully masked child of this matching sibling node, then one or more non-overlapping branches are created from the current node and adding as its children nodes the non-overlapping remaining strides from this matching sibling node.

For example, if an ACL entry 10.*.1.1 resulting in Rule A is already in the tree and 10.2.*.2 resulting in Rule B is being added and currently processing the second stride, a branch is added to handle the case of 10.2.1.1 resulting in Rule A which corresponds to matching the higher precedence ACL entry 10.*.1.1. (Note, the node for the stride being added is added in process block 956.)

For example, if an ACL entry 10.*.*.1 resulting in Rule A is already in the tree and 10.2.*.2 resulting in Rule B is being added and currently processing the third stride, a branch is added to handle the case of 10.2.*.1 resulting in Rule A which corresponds to matching the higher precedence ACL entry 10.*.*.1. (Note, the node for the stride being added is added in process block 956.)

For example, if an ACL entry 10.* resulting in Rule A and an ACL entry 10.*.*.2 resulting in Rule B are already in the tree and 10.2.*.3 resulting in Rule C is being added and currently processing the fourth stride, two branches are added: one branch to handle the case of 10.2.*.1 resulting in Rule A, and one branch to handle the case of 10.2.*.2 resulting in Rule B. (Note, the node for the stride being added is added in process block 956.)

In process block 954, a no match next field is added to the current node to point to the original branch (e.g., 10.*.1.1 in the example), and in process block 956, a current mask type node is added for the stride being added (e.g., 10.2 in the example). Processing then returns to the processing of FIG. 9A as indicated by connector C 999.

Turning to the processing of FIG. 9C, processing continues as indicated by connector D 949. As determined in process block 960, if there is a sibling of the current stride being added with the same mask and different address, then in process block 962, a current mask type node is added for the new stride.

If there is a collision with another node (e.g., the memory location for adding the node for this stride is already occupied by another node), then a new base pointer is determined for the current node (i.e., the parent node of the node being added). The new node is added at a memory location determined by the base pointer of the parent node and an offset corresponding to the stride being added, and all siblings of the new child node (e.g., all other children of the current/parent node) are moved to memory locations relative to the new base pointer. As previously discussed, the siblings of the child (e.g., the children of the current node) can be identified in numerous ways including, but not limited to traversing the subtree or using another data structure (e.g., that illustrated in FIG. 9D or another data structure). Processing returns to process block 912 of FIG. 9A as indicated by connector C 999.

Otherwise, as determined in process block 972, if the current node has a bitmap next type field, then in process block 974, the bitmap of the current node is updated with the stride being added.

Otherwise, as determined in process block 980, if the current node has a next mask field, then in process block 982, the bitmap next node typed field is added to the current node and populated according to the ACL entry being added; else in process block 984, the current node (i.e., the parent of the node being added) is changed to a bitmap next node type. In process block 986, the sibling node is changed to bitmap current node type and any additional fields are kept with the new node.

In process block 976, a bitmap current node type node is added for the new stride. If there is a collision with another node (e.g., the memory location for adding the node for this stride is already occupied by another node), then a new base pointer is determined for the current node (i.e., the parent node of the node being added). The new node is added at a memory location determined by the base pointer of the parent node and an offset corresponding to the stride being added, and all siblings of the new child node (e.g., all other children of the current/parent node) are moved to memory locations relative to the new base pointer. As previously discussed, the siblings of the child (e.g., the children of the current node) can be identified in numerous ways including, but not limited to traversing the subtree or using another data structure (e.g., that illustrated in FIG. 9D or another data structure). Processing returns to process block 912 of FIG. 9A as indicated by connector C 999.

Returning to the processing of FIG. 9A, as previously determined in process block 932, if there are entries with a non-fully masked stride at this level that overlap the path/stride being added, then processing proceeds to process block 934, wherein a set of unique branches from the current node is identified based on the overlap of the current path and stride values with the other ACL entries already added, and nodes causing the overlap are modified and/or removed so as to produce non-overlapping branches. Note, in one embodiment, the nodes are modified; while in one embodiment, nodes are removed with the non-overlapping versions of the nodes to be subsequently added in process block 937.

For example, the first two strides of two ACL entries might be 10.3 with a mask of FE with a result of Rule A, and 10.0 with a mask of FC resulting in Rule B. Thus, these entries overlap for values of 10.1 and 10.3; wherein a proper lookup for values of 10.1 and 10.3 should result in Rule A and 10.0 and 10.2 should result in Rule B (as Rule A has the higher precedence, and would be added first to the subtree). The ACL entry for Rule A could have been entered, inter alia, as two simple nodes 10.1 and 10.3 or most likely, initially as a single node of 10.0 using next/current mask fields (thus one node for this entry). In one embodiment, when the second ACL entry is added, the single node using masks is removed, and two corresponding entries are added for Rule A, and the two non-overlapping branches/values are added for Rule B. Once again, the nodes corresponding to Rule A could have been entered in the subtree in process block 934 and/or process block 937.

Once again, the unique branches are determined in process block 934. Note, in one embodiment, the unique branches result in fully expanded values; while in one embodiment, a masked overlapping node may result in a masked non-overlapping node with a same or different mask and/or different value. As determined in process block 936, while there are more unique branches to add to the subtree, then in process block 937, one of the remaining unique branches is selected in order of precedence of the ACL entries and ADDACLENTRY is performed with the remaining stride modified to reflect the selected unique branch, with the path and the current node staying the same (i.e., that of the parent of the unique branch being processed). Processing returns to process block 936. When all unique branches have been processed, a return operation is performed as indicated by process block 938 to the calling process block (i.e., process block 937) or calling program (i.e., the ACL entry has been added).

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method for programming a tree data structure, the method comprising:

identifying a parent node, the parent node including a first node value for indicating a path through a subtree in the tree data structure from a root node to the parent node, and the parent node including a first base pointer;

determining a memory location for adding a child node based on the first base pointer and a next stride value;

identifying at the memory location a second node, the second node including a second node value indicating a second path through the subtree from the root node to the second node;

determining that the second node value does not match a node value including the first node value and the next stride value indicating that the second node is not a child of the parent node;

determining a new base pointer in response said determining that the second node value does not match the node value;

updating the parent node with the new base pointer;

adding the child node at a memory location based on the new base pointer and the next stride value, the child node including a third node value indicating a path through a subtree in the tree data structure, the third node value including the first node value and the next stride value; and moving all siblings of the child node, if any are present, to memory locations relative to the new base pointer.

2. The method of claim 1, comprising traversing the subtree to identify said all siblings of the child node.

3. The method of claim 1, comprising searching a data structure different than the subtree to identify said all siblings of the child node.

4. The method of claim 1, wherein the child node is made a simple type node in response to identifying that the next stride does not include a mask.

5. The method of claim 1, comprising:

identifying that the next stride is a prefix value; and identifying that a sibling node of the child node corresponds to the prefix value and an address different than the next stride value;

wherein the child node is made a current mask type node in response to said identifying that the sibling node of the child node corresponds to the prefix value and said address different than the next stride value.

6. The method of claim 1, wherein the parent node includes a bitmap next type value, and the method includes: updating the bitmap next type value based on the next stride value.

7. The method of claim 1, wherein the parent node includes a next mask value, and the method includes: adding a bitmap next node type field to the parent node.

8. The method of claim 7, comprising changing at least one sibling node of the child node to a bitmap current node type.

9. The method of claim 1, comprising changing the parent node to a bitmap next node type.

10. The method of claim 9, comprising changing at least one sibling node of the child node to a bitmap current node type.

11. The method of claim 1, wherein the second node value comprises the first node value concatenated with the next stride value.

12. A computer-readable medium containing computer-executable instructions for performing step for programming a tree data structure, said steps comprising, the method comprising:

identifying a parent node, the parent node including a first node value for indicating a path through a subtree in the tree data structure from a root node to the parent node, and the parent node including a first base pointer;

determining a memory location for adding a child node based on the first base pointer and a next stride value;

identifying at the memory location a second node, the second node including a second node value indicating a second path through the subtree from the root node to the second node;

determining that the second node value does not match a node value including the first node value and the next stride value indicating that the second node is not a child of the parent node;

determining a new base pointer in response said determining that the second node value does not match the node value;

updating the parent node with the new base pointer;

adding the child node at a memory location based on the new base pointer and the next stride value, the child node including a third node value indicating a path through a subtree in the tree data structure, the third node value including the first node value and the next stride value; and moving all siblings of the child node, if any are present, to memory locations relative to the new base pointer.

13. The computer-readable medium of claim 12, wherein said steps comprise traversing the subtree to identify said all siblings of the child node.

14. The computer-readable medium of claim 12, wherein said steps comprise searching a data structure different than the subtree to identify said all siblings of the child node.

15. An apparatus for programming a tree data structure, the apparatus comprising:
- means for identifying a parent node, the parent node including a first node value for indicating a path through a subtree in the tree data structure from a root node to the parent node, and the parent node including a first base pointer;
- means for determining a memory location for adding a child node based on the first base pointer and a next stride value;
- means for identifying at the memory location a second node, the second node including a second node value indicating a second path through the subtree from the root node to the second node;
- means for determining that the second node value does not match a node value including the first node value and the next stride value indicating that the second node is not a child of the parent node;
- means for determining a new base pointer in response said determining that the second node value does not match the node value;
- means for updating the parent node with the new base pointer;
- means for adding the child node at a memory location based on the new base pointer and the next stride value, the child node including a third node value indicating a path through a subtree in the tree data structure, the third node value including the first node value and the next stride value; and
- means for moving all siblings of the child node, if any are present, to memory locations relative to the new base pointer.

16. An apparatus for programming a tree data structure comprising one or more processors and a memory, wherein the memory stores one or more instructions that, when executed by the one or more processors, perform the steps of:
- identifying a parent node, the parent node including a first node value for indicating a path through a subtree in the tree data structure from a root node to the parent node, and the parent node including a first base pointer;
- determining a memory location for adding a child node based on the base pointer and a next stride value;
- identifying at the memory location a second node, the second node including a second node value indicating a second path through the subtree from the root node to the second node;
- determining that the second node value does not match a node value including the first node value and the next stride value indicating that the second node is not a child of the parent node;
- determining a new base pointer in response said determining that the second node value does not match the node value;
- updating the parent node with the new base pointer;
- adding the child node at a memory location based on the new base pointer and the next stride value, the child node including a third node value indicating a path through a subtree in the tree data structure, the third node value including the first node value and the next stride value; and
- moving all siblings of the child node, if any are present, to memory locations relative to the new base pointer.

* * * * *

UNITED STATES PATENT AND TRADEMARK OFFICE
CERTIFICATE OF CORRECTION

PATENT NO. : 7,415,463 B2                            Page 1 of 1
APPLICATION NO. : 10/703733
DATED : August 19, 2008
INVENTOR(S) : Testa It is certified that error appears in the above-identified patent and that said Letters Patent is hereby corrected as shown below:

Col. 7, line 21, insert the sentence -- The term "message is used generically herein to describe a piece of information which may or may not be, but is typically communicated via one or more communication mechanisms of any type. --

Col. 7, line 32, replace "disk drives." with -- disk drives, --

Col. 26, line 6, replace "10.*" with -- 10.*.*.1 --

Signed and Sealed this

Twenty-ninth Day of December, 2009

David J. Kappos
*Director of the United States Patent and Trademark Office*